US012789389B2

(12) United States Patent
Gohl et al.

(10) Patent No.: US 12,789,389 B2
(45) Date of Patent: Nov. 10, 2026

(54) HUMANOID ROBOT COMPRISING ARTICULATED LEGS WITH WHEELS OR TRACKS

(71) Applicant: HEXAGON ROBOTICS GMBH, Zurich (CH)

(72) Inventors: Pascal Gohl, Winterthur (CH); Lukas Heinzle, Wädenswil (CH); Roman Steffen, Rebstein (CH); Matthias Wieser, Wendlingen (DE); Burkhard Böckem, Jonen AG (CH); Nikolay Khanenya, St. Gallen (CH); Claudio Iseli, Au (CH); Markus Wenk, Chur (CH)

(73) Assignee: HEXAGON ROBOTICS GMBH, Zurich (CH)

( * ) Notice: Subject to any disclaimer, the term of this patent is extended or adjusted under 35 U.S.C. 154(b) by 0 days.

(21) Appl. No.: 19/232,048

(22) Filed: Jun. 9, 2025

(65) Prior Publication Data

US 2025/0353185 A1 Nov. 20, 2025

Related U.S. Application Data

(63) Continuation of application No. 19/132,018, filed as application No. PCT/EP2022/084481 on Dec. 5, 2022.

(51) Int. Cl.
*B25J 9/16* (2006.01)
*B25J 5/00* (2006.01)
(Continued)

(52) U.S. Cl.
CPC ............ *B25J 13/084* (2013.01); *B25J 5/007* (2013.01); *B25J 9/162* (2013.01); *B25J 9/1664* (2013.01);
(Continued)

(58) Field of Classification Search
CPC . B25J 13/084; B25J 5/007; B25J 9/162; B25J 9/1664; B25J 9/1697; G05B 2219/39001; G06N 3/008
See application file for complete search history.

(56) References Cited

U.S. PATENT DOCUMENTS 7,348,747 B1 3/2008 Theobold et al.
11,080,991 B1 8/2021 Friedman et al.
(Continued)

FOREIGN PATENT DOCUMENTS

EP 1207099 A2 5/2002
EP 1207099 A3 11/2003
(Continued)

OTHER PUBLICATIONS

International Search Report dated Aug. 3, 2023 in application No. PCT/EP2022/084481.
(Continued)

*Primary Examiner* — Dalena Tran
(74) *Attorney, Agent, or Firm* — Maschoff Brennan

(57) ABSTRACT

The invention relates generally to a mobile robot, e.g. a humanoid robot, configured to provide reality capture and metrology grade geometric measurement, e.g. to generally support infrastructure surveillance and/or to support workflows in the field of metrology. Aspects of the mobile robot, inter alia, relate to providing increased accuracy of metrology grade devices to overcome deficiencies in mobile reality capture. On the other hand, benefits of mobility provided by mobile robots are transformed to the field of metrology while maintaining metrology grade accuracy.

13 Claims, 8 Drawing Sheets

(51) Int. Cl.
*B25J 13/08* (2006.01)
*G06N 3/008* (2023.01)

(52) U.S. Cl.
CPC ............ *B25J 9/1697* (2013.01); *G06N 3/008* (2013.01); *G05B 2219/39001* (2013.01)

(56) References Cited

U.S. PATENT DOCUMENTS

| | | | | |
|---|---|---|---|---|
| 11,794,332 | B2 * | 10/2023 | Kalouche | B25J 5/007 |
| 12,240,118 | B2 * | 3/2025 | Mancuzo | B25J 9/1633 |
| 12,560,937 | B1 | 2/2026 | Bernards et al. | |
| 2003/0009259 | A1 | 1/2003 | Hattori et al. | |
| 2005/0067993 | A1 | 3/2005 | Kato et al. | |
| 2012/0283746 | A1 | 11/2012 | Hu et al. | |
| 2015/0019013 | A1 | 1/2015 | Rose et al. | |
| 2017/0106738 | A1 | 4/2017 | Gillett | |
| 2017/0361461 | A1 * | 12/2017 | Tan | B25J 19/021 |
| 2019/0278252 | A1 | 9/2019 | Ogawa | |
| 2020/0376656 | A1 * | 12/2020 | Berkowitz | B25J 9/1697 |
| 2021/0032031 | A1 | 2/2021 | Kalouche | |
| 2022/0024043 | A1 * | 1/2022 | Suyama | B25J 17/02 |
| 2022/0105622 | A1 | 4/2022 | Sohmshetty et al. | |
| 2022/0395974 | A1 | 12/2022 | Balasubramanian | |
| 2024/0009834 | A1 * | 1/2024 | Eom | B25J 9/162 |
| 2026/0174386 | A1 | 6/2026 | Belson et al. | |

FOREIGN PATENT DOCUMENTS

| | | | |
|---|---|---|---|
| JP | 2003-346150 | A | 12/2003 |
| JP | 2016-155216 | A | 9/2016 |

OTHER PUBLICATIONS

Written Opinion dated Aug. 3, 2023 in application No. PCT/EP2022/084481.
Extended European Search Report dated Apr. 9, 2026 in application No. 25227559.9.
Extended European Search Report dated Apr. 15, 2026 in application No. 25227563.1.
Extended European Search Report dated Apr. 14, 2026 in application No. 25227568.0.
Garcia et al., "Rosi: A Novel Robotic Method for Belt Conveyor Structures Inspection", 2019 19th International Conference on Advanced Robotics (ICAR), 2019.
Rozlivek et al., "Multisensorial robot calibration framework and toolbox", 2020 IEEE-RAS 20th International Conference on Humanoid Robots (Humanoids), 2021.
Cesetti et al., "Development of a Flexible Test Platform for Household Appliance Testing based on Mobile Agents", 6th annual IEEE Conference on Automation Science and Engineering, 2010.
Winiarski and Banachowicz, "Automated generation of component system for the calibration of the service robot kinematic parameters", IEEE, 2015.

* cited by examiner

HUMANOID ROBOT COMPRISING ARTICULATED LEGS WITH WHEELS OR TRACKS

BACKGROUND

The disclosure relates generally to a mobile robot configured to provide reality capture and metrology grade geometric measurement, e.g. to generally support infrastructure surveillance and/or to support workflows in the field of metrology.

Reality capture is of interest for monitoring an environment, e.g. to safeguard restricted or dangerous areas such as industrial plants, construction sites, or business complexes. In addition, operation of a facility may be supported by providing quick assessment of an actual state of the environment and using the assessment to provide automated interaction with object in the environment.

Reality capture makes use of a combination of a variety of different perception sensing techniques such as optical and thermal imaging, depth-measuring, three-dimensional laser scanning, acoustic sensing, vibration measuring, etc. The referencing and fusion of different data types, e.g. laser scanner data, camera data, and positioning data such as from a global navigation satellite system, is now increasingly standardized.

Reality capture may be provided by a mobile robot configured to move through the environment and to provide perception data and referencing data at the same time, e.g, wherein at least trajectory data of the robot are provided with the acquisition of the perception data, such that perception data acquired at different positions can be combined into a common coordinate system. Often, such mobile robots are configured to autonomously create a 3D map of a new environment, e.g. by means of a simultaneous localization and mapping (SLAM) functionality.

By way of example, the perception data are analyzed by means of a feature recognition algorithm configured to automatically recognize semantic and/or geometric features captured by the perception data, e.g. by using shape information provided by virtual object data from a CAD model. Such feature recognition, particularly for recognizing geometric primitives, are nowadays widely used.

In metrology, it is a general object to determine geometrical properties such as coordinates, distances, and orientations of one or more target objects. Methods and systems for measuring geometric properties are used in many applications, e.g. very precise measurements in geodesic applications, measurement problems in the field of building installation, or for controlling or aiding industrial processes.

Metrology applications typically demand measurement accuracies that supersede accuracies provided by reality capture devices by orders of magnitude. Often, measurement devices in the field of metrology are heavy and need to be referenced or installed to a fixed position with high precision in order to provide coordinate measurement data with an accuracy better than the millimeter range, often better than the micrometer range. For example, typical metrology measurement devices are laser scanners, structured light scanners, coordinate measuring machines (CMM), and articulated measurement arms, Often, limited measurement accuracy (e.g. compared to metrology devices) is not an issue when using a mobile robot for surveillance purposes. For example, point density and distance measurement accuracy of a 3D laser scanner has to be sufficient to be able to recognize a left-behind object but there is no need to be able to recognize objects or deformations within the environment at the millimeter or even micrometer range. However, there are applications where limited measurement accuracies/capabilities of generic mobile surveillance robots cause problems. For example, generic surveillance robots still have problems in recognizing partially open windows and doors.

On the other hand, it would be beneficial to have the mobility and increased flexibility provided by mobile reality capture robots also in the field of metrology, which, for example, would reduce space required for the bulky and heavy metrology devices, increase flexibility in measuring different types of objects, and provide more efficient industrial processes. However, the structure of a mobile robot, e.g. including a lot of moveable parts and joints, introduces additional degrees of freedom, which make providing precise measuring more difficult. In addition, the mobility can lead to additional mechanical load on the sensitive metrology sensors, which must be taken into account.

SUMMARY

It is therefore an object of the present disclosure to provide a mobile robot, which overcomes deficiencies of prior art robots in the field of reality capture, particularly in the field of infrastructure surveillance.

A further object is to provide a metrology system, which provides increased flexibility and more efficient data acquisition.

One aspect relates to a humanoid robot. The robot comprises a main body, two mechanically actuated legs attached to the main body at a lower part of the main body and configured to provide locomotion of the robot over ground, two mechanically actuated arms attached to the main body at an upper part of the main body and configured to move relative to the main body and a, e.g. mechanically actuated, head attached to the main body at the top of the main body.

Each of the two mechanically actuated legs is attached to the main body by a hip joint providing movement of an upper part of the leg relative to the main body. Each of the legs further comprises a knee joint providing movement of a lower part of the leg relative to the upper part of the leg, and a wheel at a distal end away from the knee joint for contacting the ground in order to provide the locomotion.

The robot is configured to provide the locomotion in a walking mode by stepped motion of the legs and in a driving mode by rolling on the wheels.

One of the two legs (in particular each of the two legs, see below) comprises a battery compartment arranged between the knee joint and the hip joint and configured to accommodate a swappable battery. The battery-when accommodated in the battery compartment-provides electrical energy to be used for driving a motion of the robot, e.g. a motion of one the two legs (e.g. including motion of the wheels) and/or one of the two arms. In particular, the robot is configured to autonomously perform a task involving movement of a robot part and is configured that the swappable battery provides a substantial part, in particular all, of the electrical energy consumed by the robot during the performance of said task. The robot is configured to provide for a battery replacement for the battery compartment during continuous operation of the robot, e.g. during motion by the two arms.

In one embodiment, the robot comprises a further battery compartment arranged between the knee joint and the hip joint of the other of the two legs, i.e. each of the two legs comprises a battery compartment. The further battery compartment is configured to accommodate a further swappable battery. The further battery-when accommodated in the further battery compartment-provides electrical energy to be used for a motion of the robot, in particular a motion of one of the two legs (e.g. a motion by the leg itself and/or a motion of the wheel) and/or one of the two arms. Each of the battery compartments comprises a circuit breaker configured to be activated for battery replacement for the respective battery compartment and to provide electrical disconnecting of a battery located in the respective battery compartment so that the robot is still supplied with electric energy from the other battery compartment.

In a further embodiment, the humanoid robot is configured to use one of the arms to autonomously remove a battery located in the battery compartment and to autonomously place a battery into the battery compartment, particularly wherein the battery compartment comprises a quick release mechanism configured to be activated by the robot.

In a further embodiment, each of the hip joints provides movement in two rotational degrees of freedom relative to the main body and each of the knee joints provides movement in one rotational degree of freedom (e.g. to provide a folding movement for the leg).

In a further embodiment, each of the knee joints is driven by a respective electric motor located away from the knee joint and each of the legs comprises a mechanical transmission element driven by the respective electric motor, e.g. a belt or a chain, to provide mechanical actuation of the movement about the respective knee joint.

In a further embodiment, each of the arms is attached to the main body by a shoulder joint. The shoulder joint provides movement in one rotational degree of freedom, particularly two rotational degrees of freedom, relative to the main body. The arms further comprise an elbow joint and a hand joint arrangement. The elbow joint provides movement in one rotational degree of freedom, in particular for folding the arm.

In a further embodiment, the hand joint arrangement is configured for performing a gripping operation.

By way of example, the robot comprises further joints, e.g. a further joint arranged on the arm to provide a rotational degree of freedom of the arm around an arm axis. For example, the further joint is arranged between an elbow joint and the shoulder joint or between the elbow joint and the hand joint. For example, the arm axis is coaxial with an imaginary line intersecting the elbow joint and the hand joint or with an imaginary line intersecting the shoulder joint and the elbow joint.

In a further embodiment, each of the shoulder joints, the elbow joints, and the hand joints comprises a robotic drive module for driving rotary joint movement. The robotic drive module comprises a rotary drive comprising a motor circuit board, a stator, and a rotor. The rotor is configured to rotate—controlled by the motor circuit board—relative to the stator about an axis of rotation. The robotic drive module further comprises a gearbox configured to transform—according to a defined gear ratio—a rotary motion of the rotor about the axis of rotation into a rotary motion of a gearbox output component about the axis of rotation. The motor circuit board and the stator are arranged axially with respect to the axis of rotation on one side of the gearbox, denoted gearbox input side. The gearbox output component engages the gearbox from the other side of the gearbox, denoted gearbox output side. The robotic drive module further comprises a connecting part which extends from the gearbox output side to the gearbox input side and is configured to pick up the rotation of the gearbox output component in a rigid manner, thereby providing rotation of the connecting part conforming, e.g. being identical, to the rotation of the gearbox output component. The robotic drive module further comprises a rotary encoder configured to detect a rotation of the gearbox output component about the axis of rotation. The rotary encoder is arranged on the gearbox input side and configured to provide for measuring a rotation of the connecting part about the axis of rotation.

In a further embodiment, at least one of the arms, in particular at a distal end away from an attachment point of the arm, comprises a probing sensor arrangement, particularly comprising an optical sensor configured to provide optical sensor data and/or a tactile sensor configured to provide tactile scanning data. Optical comprises the whole electromagnetic spectrum, e.g. from the ultraviolet to the infrared wavelength range and also beyond that range. By way of example, an optical sensor may be embodied as an imaging sensor, e.g. a 2D or 3D imaging camera, or a laser based scanning sensor, e.g. a scanning sensor for detecting reflected light from a cooperative target and/or for detecting diffusively scattering light. In particular, probing sensor relates to a sensor configured to provide a coordinate measurement by approaching an object to be measured and determining a relative distance and/or a relative orientation of the sensor to the measured object surface. For example, the relative distance and thus the coordinate for a measurement point is probed by a single-point measurement. Alternatively, the probing sensor is moved over the surface to be measured and provides continuous sensor data to evaluate the relative distance to the object surface along the trajectory of the sensor movement. In particular, a probing sensor may be embodied as metrology grade sensor, e.g. a sensor with submillimeter distance resolution.

In a further embodiment the robot comprises a scanning lidar unit configured to provide—during movement of the robot over ground—a scanning movement of a laser measurement beam relative to two rotation axes, and, based thereof, to generate light detection and ranging data for generating a three-dimensional point cloud. The lidar unit is preferably located in an upper part of the robot, in particular in the main body and/or in the head.

In a further embodiment, the robot comprises a ToF unit. The ToF unit comprises an arrangement of time-of-flight sensors and is configured to provide—during movement of the robot over ground—3D imaging data of the environment for generating a 3D model of the environment. The ToF unit is preferably located in the upper part of the robot, in particular in the main body and/or in the head.

For example, the head comprises a top side opposite an attachment point of the head to the main body, a front side adjacent to the top side and a back side opposite the front side and being adjacent to the top side, and two opposite transverse sides respectively adjacent to the top side and the front and back sides.

In a further embodiment, each of the transverse sides comprises an imaging camera such that the two imaging cameras are arranged opposite each other and provide opposite field-of-views, particularly wherein each of the two cameras provide a fully spherical 360° field-of-view In a further embodiment, one of the two rotation axes of the lidar unit runs through the front side and the back side of the head and the lidar unit is configured to provide—with the front side facing in the direction of travel during forward locomotion—a forward-looking field of view around the one of the two rotation axes.

In a further embodiment, the ToF unit is configured to provide—with the front side facing in the direction of travel during locomotion—a forward-looking field of view.

In a further embodiment, the main body and/or the head comprises a structured light scanner configured to provide—during movement of the robot over ground—a 3D scanning of the environment for generating a 3D model of the environment.

In a further embodiment, the robot comprises a simultaneous localization and mapping unit, SLAM unit. The SLAM unit configured to carry out a simultaneous localization and mapping process, (SLAM process). The SLAM process comprising reception of perception data providing a representation of the surroundings of the robot at a current position, use of the perception data to generate a map of an environment, and localization of the robot within the map of the environment.

In a further embodiment, the robot is further configured to a.) access information regarding locations of charging and/or battery replacement stations within the map of the environment, in particular information regarding availability of charging positions and/or replacement batteries in each of the stations; b.) localize itself with respect to a location of at least one charging and/or battery replacement station within the map of the environment and provide an assessment regarding the reachability of the at least one charging and/or battery replacement station based on a charge state of the swappable batteries; and c.) trigger movement to the at least one charging and/or battery replacement station on the basis of the reachability of the station, in particular wherein the reachability is lower than a range threshold.

In a further embodiment, the robot comprises a charging element, in particular a wired connector. The charging element is configured to provide electrical energy during the battery replacement, e.g, wherein the robot is configured to autonomously connect the charging element to a charging position during the battery replacement.

In a further embodiment, the robot comprises a backup battery configured to provide electrical energy during the battery replacement. The backup battery might be a further battery in the battery compartment not replaced during the battery replacement, e.g. for embodiments wherein each of the legs comprises a swappable battery. The backup battery might also be a further battery configured emergency supply during the battery replacement.

In a further embodiment, each of the legs comprises a plurality of wheels for contacting the ground in order to provide the locomotion.

In a further embodiment, each of the legs comprises a tri-wheel arrangement. The tri-wheel arrangement comprises a.) three wheels attached to a wheel frame configured to support the three wheels in a circular pattern; b.) a main axis (linking the wheel frame to the remainder of the leg) providing a rotational degree of freedom of the wheel frame; and c.) three wheel axes which are different from the main axis, wherein the wheel axes link the wheels to the wheel frame, wherein each of the wheel axes provides a wheel rotational degree of freedom independently from the rotational degree of freedom of the main axis and from the wheel rotational degrees of freedom of the other two wheel axes.

In a further embodiment, the robot is configured to provide self-balancing movement control for movement of the arms during locomotion. The self-balancing movement supports the robot being balanced in a defined upright position. The robot comprises an inertial sensor, particularly a tilt sensor, and a gyroscopic sensor and a control algorithm configured to automatically adjust the relative pose of the two mechanically actuated arms based on the inertial sensor and the gyroscopic sensor to perform the self-balancing movement.

A further aspect of aspect, taken separately or in combination with the other aspects, relates to a humanoid robot comprising a main body and a mechanically actuated leg. The mechanically actuated leg is attached to the main body at a lower part of the main body and configured to provide locomotion of the robot over ground. The leg comprises an upper and a lower part, which are connected to each other via a joint and can be swiveled against each other around the joint.

The lower part comprises a track drive. The track drive comprises a track running over a lower pulley and an upper pulley, thereby providing a running surface between the lower and the upper pulley. The lower pulley is arranged on the lower part at a distal end away from the joint and the upper pulley is arranged closer to the joint than the lower pulley.

The robot is configured to provide the locomotion by track locomotion in a stand-up mode and in a full track mode. The stand-up mode provides a surface contact face of the running surface that has smaller area size than a surface contact face of the running surface provided by the full track mode. The stand up mode is achieved by the robot automatically arranging the lower part relative to the upper part such that during the locomotion the upper pulley is raised to a raised position that is farther from ground than a position of the lower pulley. In particular in the stand-up mode the robot supports itself by self-balancing locomotion to maintain the raised position of the upper pulley, more particularly wherein in the stand-up mode the robot supports itself by solely standing on a curved part of the track which is curved by the circumferential area of the lower pulley.

In a further embodiment, in the stand-up mode the robot is configured to support itself by self-balancing locomotion to maintain the raised position of the upper pulley, particularly for which the robot comprises an inertial sensor and a gyroscopic sensor and a control algorithm configured to automatically control the track drive (e.g. the lower pulley) based on the inertial sensor and the gyroscopic sensor such that the robot is balanced in a defined upright position associated with the raised position of the upper pulley.

In a further embodiment, the robot is configured to maintain—during the locomotion—an orientation of the main body with respect to a defined posture relative to the gravity direction, e.g, wherein at the same time an orientation of the running surface relative to the ground (i.e. the surface contact face) is maintained.

In a further embodiment, the robot comprises a ground characterization sensor configured to provide a ground quality information, in particular a parameter providing wheel-spin information. The ground quality information is based e.g. on a hardness and/or roughness and/or slope of the ground. The robot is configured to automatically set different surface contact faces of the running surface, i.e. different area sizes of the running surface contacting the ground, on the basis of the ground quality information, particularly by providing a raising and lowering of the upper pulley to different raised positions above ground relative to the lower pulley and self-balancing in each of the different raised positions.

In a further embodiment, the ground characterization sensor comprises a set of inertial sensors. The set of inertial sensors configured to provide a.) track slippage information, wherein track slippage represents a relative motion to the ground of a part of the track engaging the ground; and b.) shock information, wherein a shock represents an acceleration, in particular in the vertical direction, above a threshold.

In a further embodiment, the ground characterization sensor comprises an optical sensor arrangement, in particular comprising a stereo camera and/or a time-of-flight camera and/or a lidar sensor. The optical sensor arrangement is configured to provide a view of the ground in a direction of motion of the robot. The robot is configured to a.) use the optical sensor arrangement to provide a prediction of a ground quality information regarding a subsequent path to be travelled by the robot, and b.) automatically set one of the different surface contact faces on the basis of the prediction.

In a further embodiment the robot comprises a further mechanically actuated leg attached to the main body at a lower part of the main body. The further mechanically actuated leg comprises an upper and a lower part, which are connected to each other via a joint and can be swiveled against each other around the joint. The lower part comprises a further track drive, which comprises a track running over a lower pulley and an upper pulley, thereby providing a running surface between the lower and the upper pulley. The lower pulley is arranged on the lower part at a distal end away from the joint and the upper pulley is arranged closer to the joint than the lower pulley. The robot is configured to adapt a surface contact face of the running surface of the further track drive by arranging the lower part of the further leg relative to the upper part of the further leg such that during the locomotion the upper pulley of the further track drive is raised to a raised position that is farther from the ground than a position of the lower pulley of the further track drive, particularly wherein the robot is configured to provide the locomotion in a walking mode by stepped motion of the leg and the further leg.

A further aspect of aspect, taken separately or in combination with the other aspects, relates to a mobile robot, in particular embodied as a humanoid robot. The mobile robot comprises a locomotion unit configured to provide locomotion of the robot over ground, a simultaneous localization and mapping unit (SLAM unit), and a lidar device mounted on the robot.

The SLAM unit is configured to carry out a simultaneous localization and mapping process (SLAM process). The SLAM process comprises reception of perception data providing a representation of the surroundings of the robot at a current position, and use of the perception data to generate a map of an environment, and localization of the robot within the map of the environment.

The lidar device is configured to generate lidar data to provide a coordinative scan of the environment relative to the lidar device. The robot is configured to generate a 3D model of the environment based on the lidar data and comprises a classification algorithm. The classification algorithm is configured to a.) automatically identify within the 3D model of the environment a movable barrier object, e.g. a door or a window, that controls entry and exit between different parts of the environment; b.) assign a geometric test parameter and an associated test criterion to the barrier object, wherein the geometric test parameter provides a geometric information, wherein the test criterion provides an assessment of a blocking state of the barrier object with respect to entry and exit between the different parts of the environment as a function of the geometric test parameter; and c.) determine the blocking state of the barrier object by determining a value of the geometric test parameter and evaluating the value based on the test criterion. The robot is further configured to automatically interfere with the barrier object to change the blocking state and/or to provide for data communication with an external device to forward the blocking state.

In a further embodiment, the geometric test parameter and an associated test criterion are respectively angle information and/or distance information, of a part of the barrier object with respect to surroundings of the barrier object.

In a further embodiment, the classification algorithm is configured to identify on the barrier object a control component specifically foreseen to be used for opening and closing of the barrier object. The robot is configured to automatically interfere with the control component to change the blocking state, particularly wherein the mobile robot comprises a mechanically actuated gripping component.

In a further embodiment, the classification algorithm is configured to assign a geometric test parameter and an associated test criterion to the control component. The geometric test parameter and the associated test criterion for the control component provide for correlating a geometric pose of the control component to the blocking state.

In a further embodiment, the robot is configured to a.) access a 3D reference model, wherein the 3D reference model represents the environment with the barrier object in a reference state, particularly wherein the 3D reference model is stored on the robot or wherein the robot is configured to access an external data storage unit comprising the 3D reference model; b.) determine an alert state based on a difference analysis for identifying a difference between the 3D reference model and the 3D model of the environment, which is generated based on the lidar data, in particular regarding a geometric pose of the movable barrier object or of the control component; and c.) include the alert state in the data communication with the external device.

In a further embodiment, the mobile robot is configured to a.) access a digital reference map of the environment comprising a set of movable barrier objects and to localize itself within the reference map; b.) derive a patrol path based on the reference map, wherein the patrol path provides passing of each of the movable barrier objects of the set of barrier objects; and c.) automatically follow the patrol path and determine the blocking state of each of the barrier objects of the set of barrier objects.

In a further embodiment, the reference map comprises a plurality of movable barrier objects and the robot comprises a user interface providing selection of the set of barrier objects out of the plurality of barrier objects.

In a further embodiment, the robot is configured to access a nominal state of the barrier object and to automatically interfere with the barrier object to establish the nominal state in case the determined blocking state deviates from the nominal state.

In a further embodiment, the robot is configured to a.) provide the 3D model of the environment with a time stamp of a generation of the lidar data underlying the 3D model of the environment; b.) provide a target state of the blocking state of the barrier object based on the time stamp, particularly based on a defined time schedule providing different target states as a function of time of day, e.g. based on a day/night schedule or based on an assessment of 3D models of the environment which were generated based on older lidar data; and c.) automatically interfere with the barrier object to establish the target state in case the determined blocking state deviates from the target state and/or to provide a report to the external device based on an assessment of conformity of the determined blocking state with the target state.

In a further embodiment, the robot is configured to interfere with the barrier object based on at least one of a.) temperature data for the environment e.g. by closing of a window in case the temperature is below a threshold; b.) humidity data for the environment; and c.) weather forecast data, particularly based on a weather alert provided by the weather forecast data.

A further aspect of aspect, taken separately or in combination with the other aspects, relates to a mobile robot, in particular embodied as a humanoid robot. The mobile robot comprises a main body, a mechanically actuated articulated arm, a limb position determination arrangement and a locomotion unit configured to provide locomotion of the robot over ground.

The mechanically actuated articulated arm is attached to the main body and configured to move relative to the main body. The articulated arm is attached to the main body by a joint, e.g. swivel joint or revolute joint and comprises two limbs connected to each other by a further joint. The arm and a robot component that is different from the arm, denoted further sensor accommodation component, e.g. the main body, a head attached to the main body at an upper part of the main body, or a further arm, each comprise a probing sensor being configured to provide distance probing of a surface of an object to be measured by the robot. For example, the probing sensors of the arm is of the same or of a different type than the probing sensor of the further sensor accommodation component. Probing sensor and distance probing in the sense of the present invention means metrology grade measurements, e.g. with submillimeter accuracy, to provide a coordinate measurement by approaching an object to be measured and determining a relative distance and/or a relative orientation of the sensor to the measured object surface. For example, the relative distance and thus the coordinate for a measurement point is probed by a single-point measurement. Alternatively, the probing sensor is moved over the surface to be measured and provides continuous sensor data to evaluate the relative distance to the object surface along the trajectory of the sensor movement.

The limb position determination arrangement comprises multiple angle encoders to measure angular positions of the joint and the further joint of the articulated arm.

The robot comprises a referencing functionality, which comprises a.) scanning of the arm by means of the probing sensor of the further sensor accommodation component, and/or b.) scanning of a robot part, e.g. a part of the main body, a part of the head, or a part of the further arm, by means of the probing sensor of the arm and c.) combining data of the limb position determination arrangement with a result of the scanning of the arm and/or the scanning of the robot part to determine referencing data providing for a position determination of the probing sensor of the arm, particularly providing for a compensation of a positioning error of the limb position determination arrangement.

For example, the scanning of the arm and/or the scanning of the robot part is used to calibrate the limb position determination arrangement to improve position determination of an articulation of the arm by using the limb position determination arrangement. In other words, control and measurement of the articulation of the arm in space as provided by the limb position determination arrangement is improved. Alternatively or in addition, a position determination of the probing sensor of the arm, e.g. arranged at a hand of the arm such as indicated in FIGS. 6 and 7, is carried out based on data provided by the limb position determination arrangement and the scanning of the arm and/or the scanning of the robot part. For example, different arm positions and robot states are measured by the limb position determination arrangement and the probing sensor of the further sensor accommodation component to minimize a positioning error for the probing sensor of the arm.

In a further embodiment, the probing sensor of the further sensor accommodation component is embodied as a tracker, particularly a laser tracker or a camera based tracker, configured to track a target area, particularly a cooperative target configured to provide a tracking signal to the laser tracker. By way of example the cooperative target might be a passive reflecting unit with defined reflecting properties such as a steel sphere of known dimensions or a retroreflecting unit such as a cubic prism, wherein at least parts of a laser beam emitted by the laser tracker are reflected back, e.g. in parallel, to the laser tracker. For example, the robot comprises one or more trackers, e.g. embodied as etalon tracers or other interferometric measurement units, which can follow a "finger-probe-point" to get precisions in space of the "finger-probe-point" in micrometers. In case of multiple trackers, the tracker positions are stable against each other during the referencing functionality.

In a further embodiment, the referencing functionality comprises that the robot autonomously moves the arm and uses the probing sensor of the arm to carry out the scanning of the robot part, particularly wherein the probing sensor of the arm is embodied as optical or tactile sensor and the scanning of the robot part includes approaching and measuring different positions on the robot part by the probing sensor of the arm. By way of example, a, probing sensor at a hand of the robot, e.g. near a finger as indicated in FIG. 6 or 7, is used to touch/probe a portion of the robot itself (not at same time as robot takes measurements to measure an object to be measured), wherein the robot touches itself with different articulations, i.e. positions of the joint and the further joint. These touch/probe measurements are then used to calibrate, or re-calibrate, the limb position determination arrangement or a position of the probing sensor of the arm with respect to the main body. For example, such measurement is used to compensate effects due to the environment and aging of the robot.

In a further embodiment, the robot is configured to provide multiple settable measurement arrangements, which differ from each other by providing different positioning of the joint and the further joint. The referencing functionality comprises a.) setting one of the settable measurement arrangements and controlling of the locomotion unit to move the robot with respect to the object to be measured so that the robot assumes a calibration position where the probing sensors have an unobstructed view onto each other; and b.) carrying out the scanning of the arm and/or the scanning of the robot part in the calibration position.

In a further embodiment, the referencing functionality comprises a.) using the probing sensor of the further sensor accommodation component to scan an area of the arm spaced away from the probing sensor of the arm in order to provide 3D information of the area; b.) automatically associating the area with a relative position parameter providing a relative position of the probing sensor of the arm with respect to the area by taking into account the 3D information; and using the relative position parameter to determine the referencing data.

In a further embodiment, the arm comprises a pattern, in particular a visual pattern. The robot is configured to a.) automatically recognize a pattern section within a measurement of the pattern by the probing sensor of the further sensor accommodation component; and b.) automatically associate the pattern section to the position parameter, wherein the position parameter provides a relative position of the pattern section with respect to the probing sensor of the arm.

In a further embodiment, the robot is configured to access a 3D model of the arm and to automatically recognize an arm feature within a measurement by the probing sensor of the further sensor accommodation component. The referencing functionality comprises a.) automatically associating the arm feature to an arm feature within the 3D model of the arm; b.) based thereof, associating the arm feature to a further relative position parameter providing a relative position of the arm feature with respect to the probing sensor of the arm; and c.) using the further relative position parameter to determine the referencing data.

In a further embodiment, the distance probing is provided by laser based scanning and/or camera based scanning.

In a further embodiment, the robot comprises a further mechanically actuated articulated arm attached to the main body. The further arm being different from the further sensor accommodation component. The further arm is attached to the main body by a joint and comprises two limbs connected to each other by a further joint. The arm and the further arm are configured to move independently from each other relative to the main body. The limb position determination arrangement comprises multiple angle encoders to measure angular positions of the joint and the further joint of the further arm. The further arm comprises a probing sensor being configured to provide distance probing of a surface of an object to be measured by the robot. Thus, the robot comprises at least three probing sensors, i.e. one comprised by each of the arms and one comprised by the further sensor accommodation component, e.g. the main body, a leg of the robot, or the head of the robot. The referencing functionality comprises a.) a mutual scanning of the arms and the further sensor accommodation component by means of the probing sensors; and b.) using results of the mutual scanning to determine the referencing data.

A further aspect of aspect, taken separately or in combination with the other aspects, relates to a mobile robot, in particular embodied as a humanoid robot. The mobile robot comprises a locomotion unit, configured to provide locomotion of the robot over ground, a mechanically actuated multi-joint articulation system, a position determination arrangement, and a coupling interface.

The mechanically actuated multi-joint articulation system comprises multiple joints and is configured to provide movement of an interaction component relative to a reference point on the robot. The interaction component comprises a probing sensor. The probing sensor is configured to provide optical and/or tactile distance probing of a surface of an object to be measured by the robot.

The coupling interface is configured to provide docking of a docking point of the robot to a coupling counterpart, e.g. a coupling counterpart arranged at a measurement platform configured to support the object to be measured. The interaction component is connected to the docking point via a subset of the multiple joints. The freedom of movement of the interaction component relative to the docking point depends on joint positions of the subset of the multiple joints and is independent of joint positions of the remainder of the multiple joints. The robot is configured to provide 3D scanning by moving the subset of multiple joints and taking measurements by the probing sensor.

The position determination arrangement is configured to provide determination of angular positions of the multiple joints. The position determination arrangement is configured to provide increased angular position determination accuracy for the subset of the multiple joints compared to the remainder of the multiple joints, in particular in a docked state of the robot.

In a further embodiment, the docking is a releasable mechanical docking and in a docked state the interaction component is mechanically connected to the coupling counterpart via the subset of the multiple joints and the coupling interface.

In a further embodiment, the coupling interface is configured that the docking is provided as rigid docking to the coupling counterpart, e.g. by a three-point support between the coupling interface and the coupling counterpart.

In a further embodiment, the coupling interface is configured to provide that all six degrees of freedom in space are fixed when the coupling interface is docked to the coupling counterpart.

In a further embodiment, the coupling interface comprises a coupling sensor unit, particularly comprising a capacitive sensor with a measuring range of less than 1 cm and/or a camera, configured to continuously determine a positional 6DoF change relative to the coupling counterpart.

In a further embodiment, each of the joints of the subset of the multiple joints comprises a robotic drive module for driving rotary joint movement. The robotic drive module comprises a rotary drive comprising a motor circuit board, a stator, and a rotor. The rotor is configured to rotate—controlled by the motor circuit board—relative to the stator about an axis of rotation. The robotic drive module further comprises a gearbox configured to transform—according to a defined gear ratio—a rotary motion of the rotor about the axis of rotation into a rotary motion of a gearbox output component about the axis of rotation. The motor circuit board and the stator are arranged axially with respect to the axis of rotation on one side of the gearbox, denoted gearbox input side. The gearbox output component engages the gearbox from the other side of the gearbox, denoted gearbox output side. The robotic drive module further comprises a connecting part which extends from the gearbox output side to the gearbox input side and is configured to pick up the rotation of the gearbox output component in a rigid manner, thereby providing rotation of the connecting part conforming, in particular identical to the rotation of the gearbox output component. The robotic drive module further comprises a rotary encoder configured to detect a rotation of the gearbox output component about the axis of rotation. The rotary encoder is arranged on the gearbox input side and configured to provide for measuring a rotation of the connecting part about the axis of rotation.

In a further embodiment, the robot comprises a laser tracker. The laser tracker is configured to be arranged in a fixed positional relationship to the docking point. By way of example the laser tracker is rigidly mounted on the robot or arranged on a movable component of the robot which provides an end stop with a fixed positional relationship to the docking point. The laser tracker is configured to provide automatic laser-based tracking of a part of the robot which is moved by at least one of the joints of the subset of the multiple joints and to determine 3D position data of the part of the robot.

In a further embodiment, the robot comprises a camera arrangement. The camera arrangement is configured to be arranged in a fixed positional relationship to the docking point. By way of example the camera is rigidly mounted on the robot or arranged on a movable component of the robot which provides an end stop with a fixed positional relationship to the docking point. The camera arrangement is configured to provide automatic image-based tracking of a further part of the robot which is moved by at least one of the joints of the subset of the multiple joints and to determine 3D position data of the further part of the robot, particularly wherein the further part comprises a visual pattern for aiding the image-based tracking.

In a further embodiment, the robot comprises a further interaction component. The further interaction component is configured to grab an object and being moved by moving multiple joints of the multi-joint articulation. The further interaction component is connected to the docking point via a further subset of the multiple joints. The freedom of movement of the further interaction component relative to the docking point depends on joint positions of the further subset of the multiple joints and is independent of joint positions of the subset of the multiple joints and the remainder of the multiple joints. The position determination arrangement is configured to provide increased angular position determination accuracy for the further subset of the multiple joints compared to the remainder of the multiple joints, in particular in a docked state of the robot. In particular the position determination accuracy of the further subset of the multiple joints is similar to the subset of the multiple joints. The robot is configured to provide the 3D scanning by grabbing the object to be measured by the further interaction component and moving the further subset of multiple joints. The further interaction component might comprise clamping or alternative fixing elements configured to provide a rigid pose relationship between the further interaction component and the object to be measured.

In a further embodiment, the robot is configured to derive pose information of the coupling counterpart relative to a mounting platform carrying the coupling interface. The coupling counterpart is arranged on the mounting platform and configured to interact with the coupling interface to provide the docking, in particular wherein the robot is configured to access the pose information by electronic communication through the docking point.

In a further embodiment, the robot comprises an optical perception sensor. The optical perception sensor is configured to a.) use the perception sensor for pattern identification and pattern analysis of a pattern arranged on the coupling counterpart and/or the mounting platform; and b.) associate the pattern with a pose parameter providing the pose information, particularly by accessing a database comprising different patterns and associated pose parameters for each of the different patterns.

In a further embodiment, the coupling counterpart is arranged at a measurement platform configured to support the object to be measured. The measurement platform comprises a first and a second coupling counterpart wherein the first and the second coupling counterparts are arranged spaced-apart from each other. Each of the first and the second coupling counterparts is configured to interact with the coupling interface to provide docking of the docking point of the robot to the measurement platform. The robot is configured to a.) derive first pose information of the first coupling counterpart relative to the measurement platform and to derive second pose information of the second coupling counterpart relative to the measurement platform; and b.) provide 3D scan data for the object to be measured by i) docking to the first coupling counterpart and providing first distance probing data relative to a first docking position of the first coupling counterpart by distance probing with the probing sensor; ii.) docking to the second coupling counterpart and providing second distance probing data relative to a second docking position of the second coupling counterpart by distance probing with the probing sensor, and iii.) merging the first distance probing data with the second distance probing data by using the first and the second pose information.

In a further embodiment, the robot is configured to perform a docking pose adjustment measurement. The docking pose adjustment measurement comprises a.) selecting a set of cardinal features, wherein i.) a pose of the features of the set cardinal features relative to the first coupling counterpart is comprised by the first distance probing data, and ii.) the features of the set cardinal features are accessible by the probing sensor when the robot is docked to the second coupling counterpart; b.) comparing poses of features of the set cardinal features in the first and second distance probing data; and c.) using the comparing for the merging of the first distance probing data with the second distance.

A further aspect of aspect, taken separately or in combination with the other aspects, relates to a system for providing maintenance information for multiple machines in a factory environment. The system comprises a mobile robot, e.g. a humanoid robot, a microphone arrangement, an event detector, and a localization unit.

The microphone arrangement comprises multiple microphones and is configured to acquire sounds generated within the factory environment. The system is configured to use the microphone arrangement for providing sound data based on the acquired sounds.

The event detector is configured to analyze the sound data and, based thereof, to automatically recognize within the noise data a singled-out noise associated with one of the multiple machines if the singled-out noise deviates from a defined norm. The localization unit configured to determine a location of the singled-out noise within the factory environment based on sound triangulation.

The mobile robot comprises a mechanically actuated arm configured to move relative to a reference point on the robot, a locomotion unit configured to provide locomotion of the robot over ground, and an optical perception unit configured to provide for perception of part of the surroundings of the robot. The robot is configured to automatically move to different positions within the factory environment. The robot further comprises a vibration sensor arranged on the mechanically actuated arm. The robot is configured to recognize a.) one of the machines located at the location of the singled-out noise by using the optical perception unit; b.) assign a vibration measuring point on the machine to the one of the machines; and c.) bring a probing component of the vibration sensor into contact with the vibration measuring point to generate vibration data of the one of the machines. The system is configured to determine a maintenance state of the one of the machines based on the vibration data.

In a further embodiment, the vibration data are generated by direct motion coupling.

In a further embodiment, the system is configured to determine the maintenance state by comparing the vibration data with comparison data associated with the vibration measuring point.

In a further embodiment, the comparison data are derived from a history of vibration data associated with a defined task executed by one of the multiple machines, particularly the one of the multiple machines or a machine of the multiple machines of the same machine type as the one of the multiple machines.

In a further embodiment, the system is configured to use a machine learning algorithm to train a vibration model providing indicators for different maintenance states based on a history of sound data of one of the multiple machines and the history of vibration data, particularly by including operator feedback indicating an abnormal state and a normal state.

In a further embodiment, the system is configured to determine the maintenance state by carrying out a correlation analysis to determine a correlation of the singled-out noise and the vibration data, particularly by using a matched filter with a matching template being selected from a library of templates for different machine states, more particularly wherein the system is configured to update the library of templates upon detection of a new machine state e.g. based on the machine learning model and/or on operator feedback.

In a further embodiment, the system further comprises a database. The robot is configured to access the database and the database provides association of one or more vibration measurement points to each of the multiple machines, particularly by means of a lookup table.

In a further embodiment, at least part of the multiple microphones is specifically foreseen to be installed in the factory environment.

In a further embodiment, at least part of the multiple microphones are arranged on the robot and the robot is configured to patrol the factory environment in a defined patrol pattern during which it acquires sounds from the factory environment, particularly wherein the robot comprises the event detector.

In a further embodiment, the robot comprises a unidirectional microphone, in particular with a sensitivity below 40 dBA, and the localization unit is configured to determine the location of the singled out noise based on an orientation and sound level of the unidirectional microphone.

In a further embodiment, the robot is configured to a.) access or derive a digital model of the factory environment, in particular on the basis of the virtual perception data, such that the digital model comprises the location of a plurality of machines; b.) access or derive a patrol pattern comprising a plurality of sound acquisition points, wherein the sound acquisition points are provided such that sound generated by each of the plurality of machines is acquired in at least one sound acquisition point of the patrol pattern; and c.) to perform the patrol pattern based on the digital model of the factory environment such that at each of the sound acquisition points the sounds generated within the factory environment is acquired for the event detector and localization units.

A further aspect of aspect, taken separately or in combination with the other aspects, relates to a system comprising a computing unit and a mobile robot, in particular a humanoid robot.

The robot comprises a mechanically actuated arm configured to move relative to a reference point on the robot, a locomotion unit configured to provide locomotion of the robot over ground, and an optical perception unit configured to provide perception data for optical perception of part of the surroundings of the robot and a simultaneous localization, a power cable, and mapping unit, SLAM unit.

The SLAM unit is configured to carry out a simultaneous localization and mapping process, SLAM process. The SLAM process comprising reception of the perception data providing a representation of the surroundings of the robot at a current position, use of the perception data to generate a map of an environment, and localization of the robot within the map of the environment.

The mechanically actuated arm is configured to autonomously plug the power cable into a power outlet with the aid of the optical perception unit.

The computing unit is configured to a.) automatically recognize a power outlet compatible with the power cable within the perception data; b.) determine a location of the power outlet within the map of the environment and to store the location of the power outlet in the map of the environment; and c.) keep track of a relative position of the robot with respect to locations of power outlets stored in the map of the environment and to dispatch the robot to one of the locations of power outlets stored in the map of the environment as a function of remaining energy level of the robot.

In a further embodiment, the robot is configured to be charged on a charging station. The system is configured to dispatch the robot to the one of the locations of power outlets by evaluating energy consumption to reach the charging station against energy consumption to reach the one of the locations of power outlets, e.g. based on a threshold criterion for a remaining energy level of the robot.

In a further embodiment, the robot comprises a plurality of power cables, each configured to be compatible with different power outlets respectively. The computing unit is configured to automatically categorize a power outlet within the perception data to assign the power outlet to one of the plurality of power cables, which is compatible with the power outlet within the perception data.

In a further embodiment, the computing unit is configured to a.) further categorize the compatible power outlets based on their charge rate characteristics, in particular on the voltage and current; and b.) to dispatch the robot to the locations of power outlets further on the basis of the charge rate characteristics of the power outlet, in particular to the reachable power outlet with the highest maximal charge rate.

In a further embodiment, the system comprises a plurality of mobile robots. Each of the robots of the plurality of mobile robots comprises a power cable and a power outlet. The power cable and the power outlets of the robots are compatible with each other, enabling connection between two of the robots and a transfer of electric energy between the two robots. One of the robots of the plurality of mobile robots is configured to send an alert signal, if the one of the robots cannot access neither a charging station nor a power outlet. The system is configured to dispatch a further robot of the plurality of mobile robots to the location of the one of the robots. The one of the robots and the further robot are configured to autonomously connect each other by connecting the power cable of the one of the robots to the power outlet of the further robot to transfer electrical energy from the further robot to the one of the robots.

BRIEF DESCRIPTION OF THE DRAWINGS

The mobile robot and system according to the different aspects are described or explained in more detail below, purely by way of example, with reference to working examples shown schematically in the drawing. Identical elements are labelled with the same reference numerals in the figures. The described embodiments are generally not shown true to scale and they are also not to be interpreted as limiting. Specifically.

DETAILED DESCRIPTION

Figure 1:
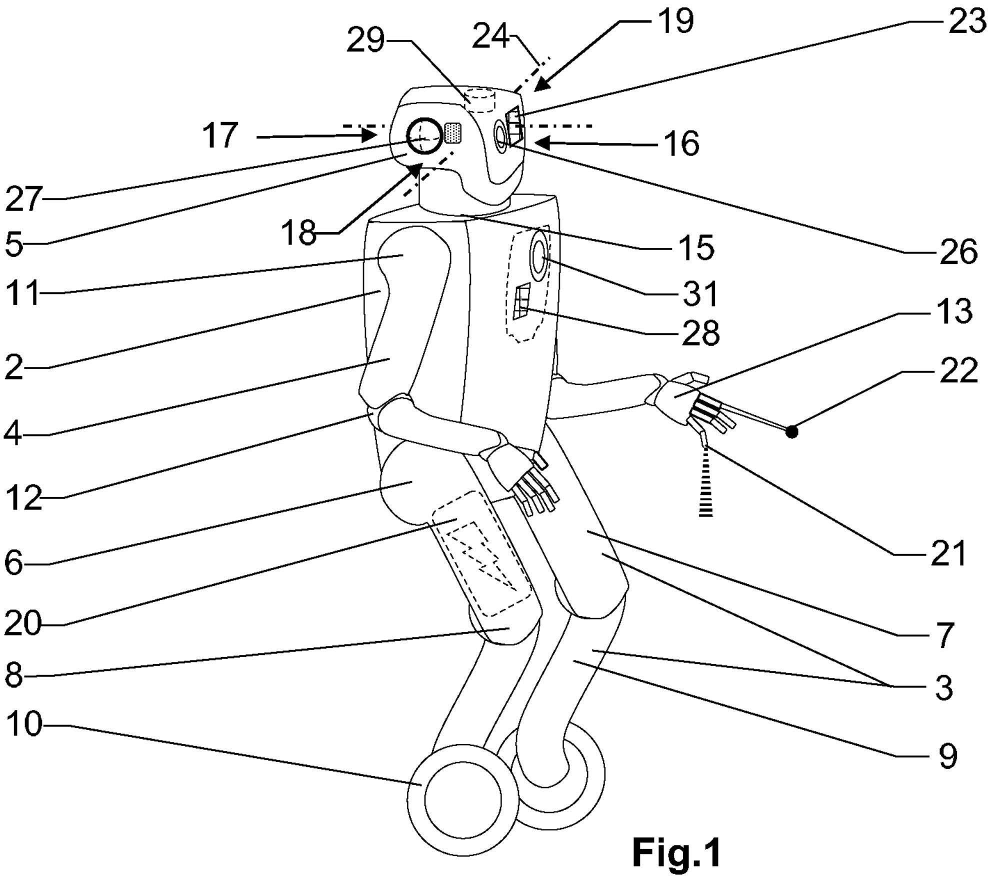
FIG. 1: an exemplary embodiment of a humanoid robot.

FIG. 1 shows an exemplary embodiment of a humanoid robot 1. The robot 1 comprises a main body 2, two mechanically actuated legs 3, two mechanically actuated arms 4, and a head 5, e.g, wherein also the head is mechanically actuated to be moveable relative to the main body 2.

The two legs 3 are attached to the main body 2 at a lower part of the main body and configured to provide locomotion of the robot 1 over ground. Each of the legs 3 is attached to the main body 2 by a hip joint 6 providing movement of an upper part 7 of the leg relative to the main body 2. Each of the legs 3 further comprises a knee joint 8 providing movement of a lower part 9 of the leg relative to the upper part 7 of the leg and a wheel 10 at a distal end away from the knee joint 8 for contacting the ground in order to provide the locomotion. For example, each of the hip joints 6 provides movement in two rotational degrees of freedom relative to the main body 2 and each of the knee joints 8 provides movement in one rotational degree of freedom, e.g. to provide a folding movement for the leg 3.

The two arms 4 are attached to the main body 2 at an upper part of the main body 2 and configured to move relative to the main body 2. Each of the two arms 4 is attached to the main body 2 by a shoulder joint 11, e.g, wherein the shoulder joint 11 provides movement in two rotational degrees of freedom relative to the main body. In the example shown, each of the two arms 4 further comprises an elbow joint 12 and a hand joint arrangement 13. Each of the elbow joints 12 provides movement in one rotational degree of freedom, e.g. for providing an arm folding movement. The hand joint arrangement 13 is configured to provide for performing a gripping operation. By way of example, the hand joint arrangement is configured to provide a hand embodied like a human hand. Alternatively, the hand joint arrangement provides for a simpler gripping tool like a two or three fingered claw.

The head 5 comprises a top side 14 opposite an attachment point 15 of the head 5 to the main body 2, a front side 16 adjacent to the top side 14 and a back side 17 opposite the front side 16 and being adjacent to the top side 14, and two opposite transverse sides 18, 19 respectively adjacent to the top side 14 and the front and back sides 16, 17. In other words, assuming a nominal head position of the robot during forward movement over a horizontal ground, the top side 14 faces to the sky, the front side 16 (also referred to as "face" of the robot) faces in the direction of travel, the back side 17 faces backwards, and the two transverse sides 18, 19, face in a horizontal direction perpendicular to the direction of travel.

The robot 1 is configured to provide the locomotion in a walking mode by stepped motion of the legs 3 and in a driving mode by rolling on the wheels 10. The driving mode is also referred to as so-called "Segway" mode, wherein the robot 1 is configured to provide self-balancing movement control of the wheels 10 to keep the robot in a defined upright position, e.g. by the help of a control algorithm making use of inertial sensors and gyroscopic sensors to automatically provide motor adjustments to maintain the upright position.

For example, the robot is further configured to provide the self-balancing movement by the aid of an automatic movement control for movement of the arms during locomotion so that movements by the arms 4 support the robot being balanced in the defined upright position. By way of example, the robot comprises a control algorithm configured to automatically adjust the relative pose of the two mechanically actuated arms based on the tilt sensors and the gyroscopic sensors so that the weight and orientation of the arms 4 provide a stabilizing effect to maintain the upright position of the robot 1.

The robot may be configured to choose the appropriate driving mode on its own, e.g. based on an analysis of the ground and/or the environment. By way of example, the stepped motion provides movement over uneven terrain or for walking on stairs. The driving mode may further be configured to provide a curve movement wherein the robot "leans" into a curve by shortening one of the legs, e.g. to allow for taking curves with faster speed and/or for reducing the curve radius.

The robot 1 may be configured to provide a storage configuration by folding the arms 4 and legs 3, wherein in the storage configuration a sum of a height, width and length and/or the volume of an enveloping cuboid of the humanoid robot 1 is reduced. For example, the robot 1 is configured to assume the storage configuration without assistance by using a defined control sequence of motors driving the robot joints.

Although some aspects described herein have been explained with reference to a simpler type of mobile robot, it goes without saying that these aspects can also be implemented on the basis of a humanoid robot 1 as described above.

In the embodiment shown in the figure, the robot 1 further comprises a variety of different sensor types and a specific embodiment of an power supply using swappable batteries as described below with reference to FIG. 1. Different embodiments of a humanoid robot can comprise a different combination of these sensor types (e.g, wherein only one of these sensor types is used) and a different power supply, respectively.

Here, one of the two legs 3 comprises a battery compartment 20 arranged between the knee joint 8 and the hip joint 6. The battery compartment 20 is configured to accommodate a swappable battery such that the battery—when accommodated in the battery compartment 20—provides electrical energy to be used for driving motion by the two legs 3 and the two arms 4. The robot 1 is configured to provide for a battery replacement for the battery compartment 20 during continuous operation of the robot, e.g. during motion by the two arms 4.

In particular, the robot 1 comprises in each leg such a battery compartment 20, i.e. both being arranged between the respective knee and hip joints. Each of the battery compartments is configured to accommodate a battery, which provides electrical energy to be used for driving motion by the two legs and the two arms. Each of the battery compartments comprises a circuit breaker configured to be activated for battery replacement for the respective battery compartment and to provide electrical disconnecting of a battery located in the respective battery compartment so that the robot is still supplied with electric energy from the other battery compartment. For example, the robot 1 is configured to autonomously swap a battery of one of the battery compartments, e.g. by using one of the arms 4. Autonomous swapping of a battery by the robot may be aided by a quick release functionality provided by the battery compartment 20, e.g, wherein the quick release is activated by an operation of the arm or a hand of the robot and/or wherein the quick release is activated by an electronic signal provided by the robot 1.

One of the arms 4 comprises an optical sensor 21 configured to provide optical sensor data, e.g. visual data by a camera or laser-based data by a lidar unit. The hand joint arrangement 13 is configured to provide a human-like hand with five fingers and the optical sensor 21 is arranged at a finger tip of one of the five fingers. For example, the robot 1 is configured to use the optical data for optical probing of a surface to be measured. Alternatively or in addition, the robot 1 is configured to use the optical sensor data to aid a gripping operation by the hand.

The robot 1 further comprises a tactile sensor 22 arranged at one of the other fingers. For example, the tactile sensor 22 comprises a ruby sphere and the mobile robot is configured to provide tactile scanning data by providing a distal end-point coordinate of the tactile sensor 22.

The head 5 comprises a scanning lidar unit 23 configured to provide—during movement of the robot over ground—a scanning movement of a laser measurement beam relative to two rotation axes 24, 25. For example, one of the two rotation axes 25 of the lidar unit 23 runs through the front side 16 and the back side 17 and the lidar unit 23 is configured to provide a forward-looking field of view around the one of the two rotation axes 25 and, based thereof, to generate light detection and ranging data for generating a three-dimensional point cloud.

Here, the head 5 also comprises a ToF unit 26 comprising an arrangement of time-of-flight sensors and being configured to provide—during movement of the robot over ground—3D imaging data of the environment for generating a 3D model of the environment. In the embodiment shown, the ToF unit 26 is arranged at the front side 16 and provides a forward-looking field of view.

The head 5 further comprises two imaging cameras 27, namely one camera arranged on each of the transverse sides 18, 19. The cameras 27 are arranged opposite each other and provide opposite "sideways-looking" field-of-views. For example, each camera 27 is a color camera, e.g. an RGB camera, configured to provide a fully spherical 360° field-of-view. The cameras 27 may also be embodied as so-called RIM (range imaging) or ToF (time-of-flight) cameras.

The main body 2 comprises a structured light scanner 28, e.g. arranged in a chest area in an upper area of the main body 2 and configured to provide a forward-looking field-of-view. By way of example, the structured light scanner 28 is used for 3D scanning of the environment during movement of the robot 1 over ground and/or for 3D scanning of a specific object in the environment, e.g. for which the robot is placed in front of a particular object to be measured with the chest facing to the object. For example, for such object scanning the robot 1 may assume one or a plurality of positions around the object (always with the chest facing to the object) to provide an all-around scan of the object.

The robot 1 can comprise further sensor types, e.g. a positioning unit 29, e.g. to provide location and/or navigation, a communication unit (not shown), a microphone unit 30, a communication unit (not shown), an inertial measurement unit (not shown), and a thermal imaging unit 31 unit. By way of example, the positioning unit 29 is embodied as a GNSS-based or WLAN-based positioning unit arranged the head 5, the microphone unit 30 is also arranged in the head 5, and the thermal imaging unit 31 is arranged in the chest area of the main body 2.

By way of example, the robot 1 further comprises a simultaneous localization and mapping (SLAM) unit configured to carry out a simultaneous localization and mapping process based on perception data provided by one of the above-mentioned sensors. For example, the SLAM process is based on visual data provided by the cameras 27 in the head 5 and/or on lidar data provided by the lidar unit 23 in the head 5.

Figure 6:
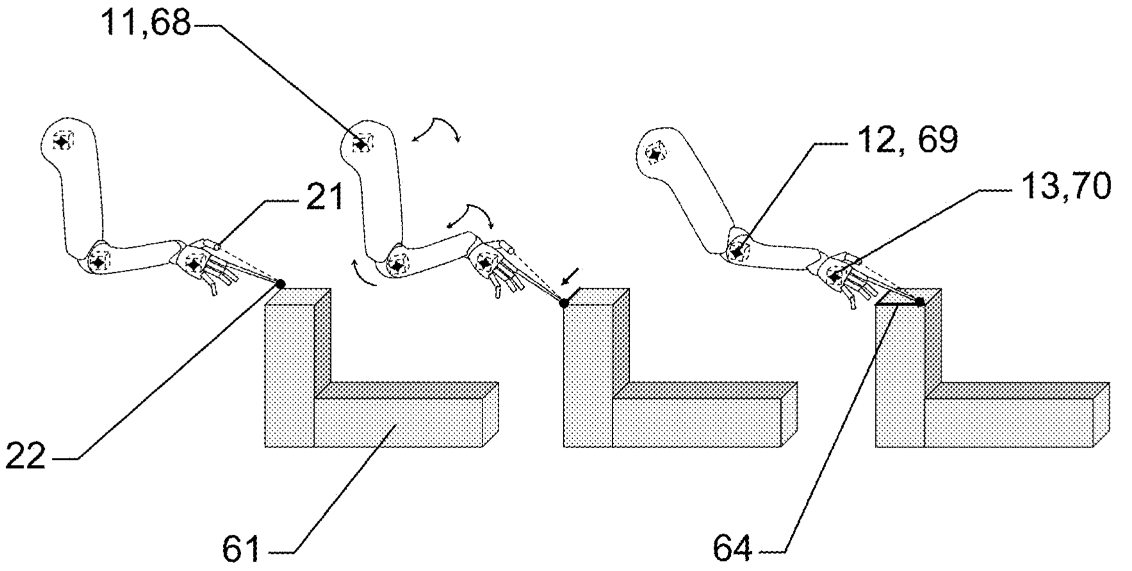
FIG. 6: a further exemplary embodiment of a humanoid robot, wherein the robot is configured to perform a coordinate measurement of a measurement object by tactile probing.
Figure 7:
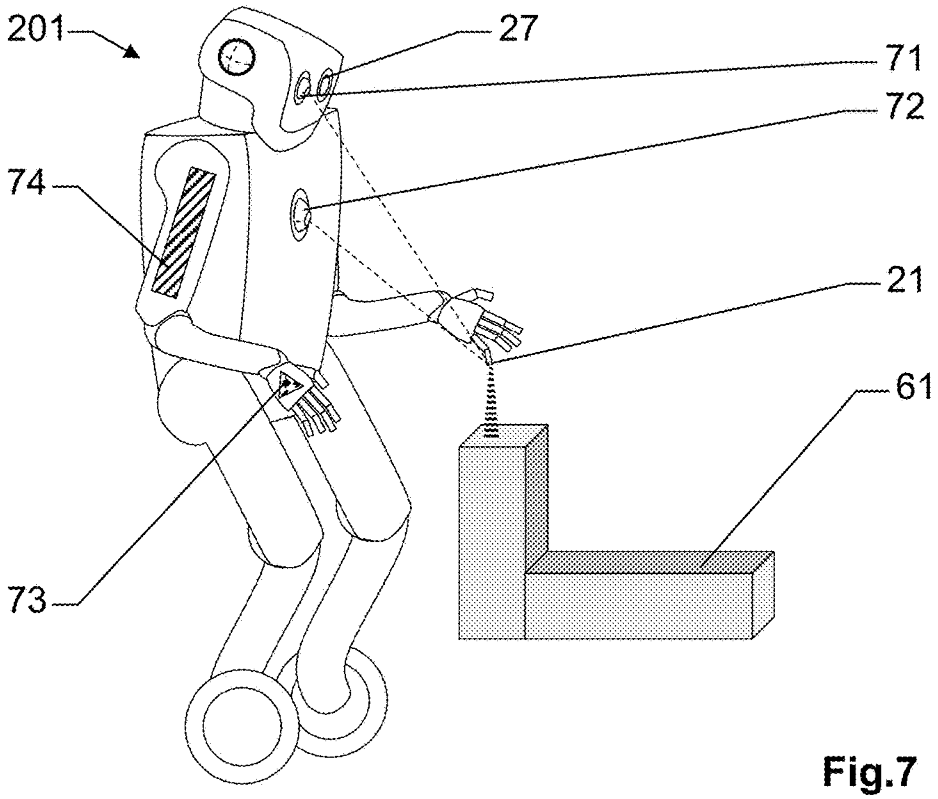
FIG. 7: a further exemplary embodiment of a humanoid robot, wherein the robot is configured to perform a coordinate measurement of a measurement object by optical probing.
Figure 8:
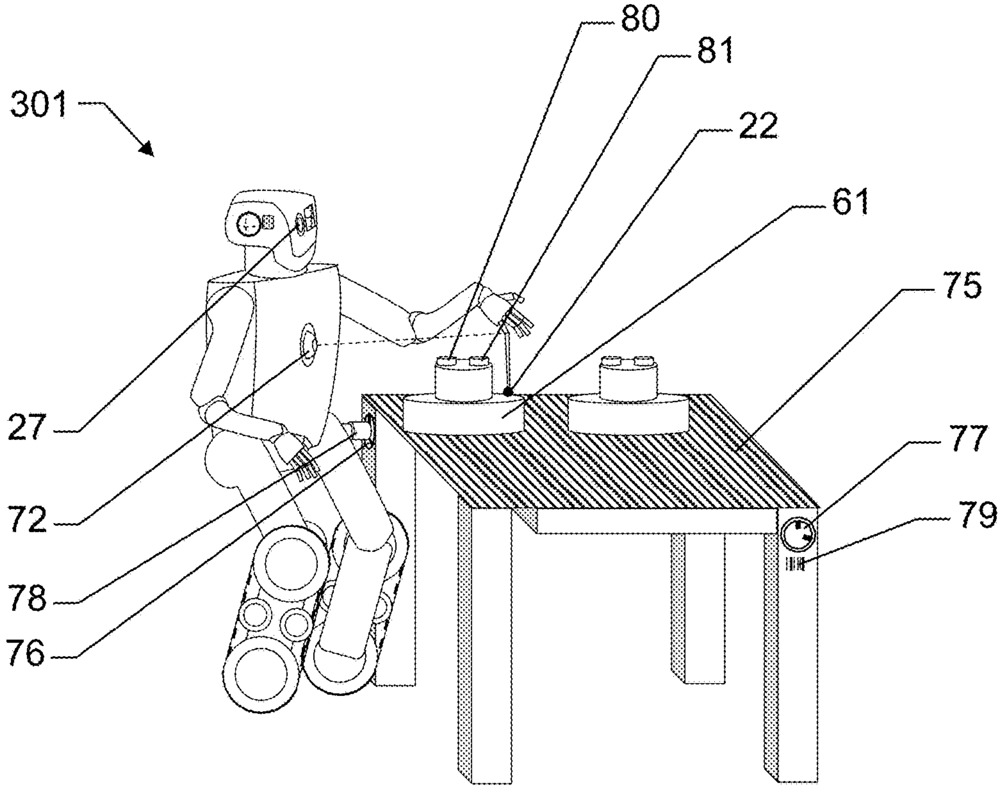
FIG. 8: a further exemplary embodiment of a humanoid robot, wherein the robot comprises a coupling interface configured to provide releasable rigid docking to a measurement platform.

By way of example, a robot, e.g. a humanoid robot 1 as described above, can be configured for hidden feature inspection because it can essentially freely move at any time and to any location where inspection is needed. Using local inspection sensors (e.g. probing sensors and camera/laser based tracking sensors as indicated in FIGS. 6 to 8), precise inspection is possible from all sides of the object to be measured. The robot can reach geometrical features to be inspected which cannot be reached traditionally without relocating a measuring machine relative to the object to be measured, which is usually quite cumbersome. The robot can easily move to the back side of a part to be inspected, or even inside the part to be inspected (at least partially), and thus provides more flexibility and autonomy to inspect parts. In particular, the robot is particularly well suited to inspect large-scale parts.

For example, measurements by a local sensor at the hand (e.g. see FIGS. 6 to 8) are combined with an accurate robot-based position of the hand/of the local sensor. By determining a position of the robot within an inertial system, e.g. by using etalon tracers or by measuring relative to the robot with one hand and reference to the other hand, large parts such as wind turbines, blades, power plants, parts of ships, air planes, trains, etc. can be inspected with flexibility. By way of example, a large part is inspected during assembly where some local features of the need to be inspected precisely and related to an outer inertial system with a certain accuracy, e.g. fitting a wing on an airplane. The robot can move to the location where the interfaces to fit the parts are located, inspect them with the local sensor, and get a precise relation between the features on both sides of the interfaces by keeping one hand on the one feature (for reference) and move the other hand on the other feature to be inspected and/or by tracking global position of the robot and using the local sensor on the hand for inspection at the same time.

Figure 2:
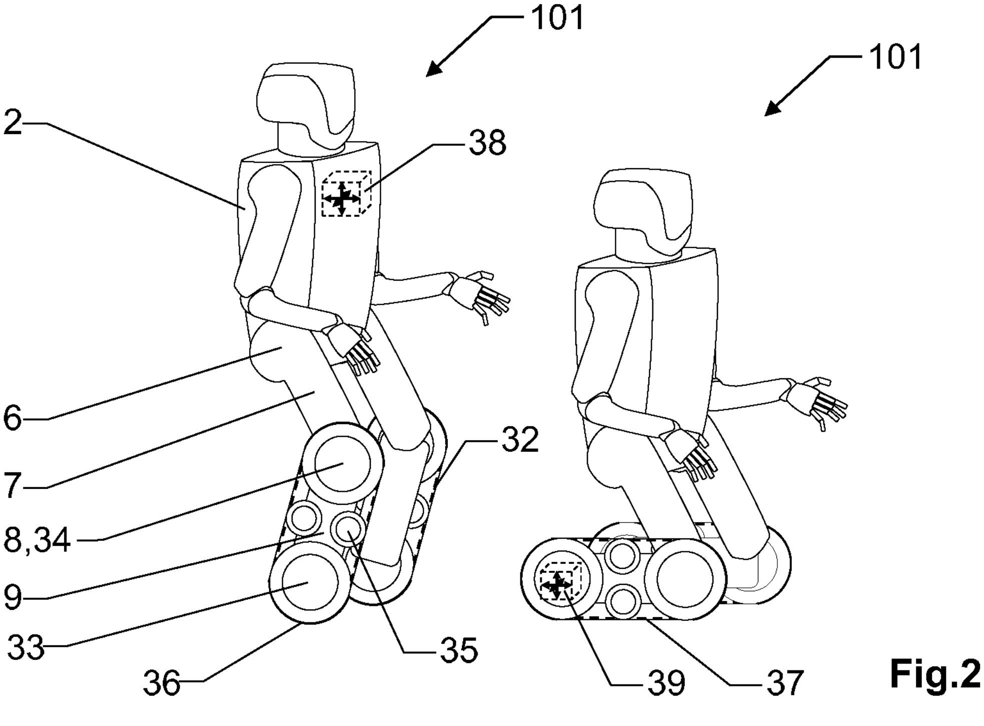
FIG. 2: a further exemplary embodiment of a humanoid robot, wherein the robot comprises a track drive to be used in a stand-up mode and a full track mode.

FIG. 2 depicts a further exemplary humanoid robot 101, here with an alternative embodiment to provide locomotion of the robot 101. The legs 3 are attached to the main body 2 by the hip joints 6. Each of the legs 3 comprises an upper part 7, in particular an upper part 7 comprising a battery compartment (not shown, see FIG. 1), and a lower part 9 connected to each other by the knee joint 8, wherein the knee joint 8 provides a swiveling movement of the lower part 9 relative to the upper part 7. The lower part 9 comprises a track 32 running over a lower pulley 33 and an upper pulley 34. The lower pulley 33 is arranged on the distal end away from the knee joint 8. The upper pulley 34 is arranged closer to the knee joint 8, e.g, wherein its suspension arrangement might comprise elements of the knee joint 8. By way of example, as shown in the figure, the complete lower part 9 is embodied as the track 32.

The lower part 9 of the leg (the track 32) further comprises one or more support pulleys 35 arranged between the lower pulley 33 and the upper pulley 34 such that the one or more support pulleys 35 is/are in contact with the track 32. For example, the upper pulley 34 is a driven pulley, wherein the upper pulley 34 is driven by utilizing components arranged in the knee joint 8 and/or in the upper part 7 of the leg. The lower pulley 33 might be a driven pulley too, e.g, wherein separate motors drive the upper pulley 34 and the lower pulley 33, respectively. For example, a driven pulley comprises an electric motor integrated into or onto the pulley.

The left of the figure depicts the robot 101 in a so-called “stand-up mode”, while on the right the robot 101 is depicted in a so-called “full track mode”.

In the stand-up mode, a surface contact face of the running surface has smaller area size than a surface contact face of the running surface provided by the full track mode. In the example, shown, the robot 101 supports itself by standing on a curved part of the track 36 which is curved by the circumferential area of the lower pulley 33, wherein the locomotion is provided by a self-balancing locomotion (over the lower pulley 33). By way of example, the robot comprises an inertial sensor unit 38 in the main body 2, e.g. tilt sensors and gyroscopic sensors, and a control algorithm configured to automatically control movement of the lower pulleys 33 based on the sensors readings such that the robot is balanced in a defined upright position.

For example, in the full track-mode the robot 101 supports itself by standing on the largest possible surface contact face provided by the track 37 and the locomotion is provided by track locomotion. The track drive might comprise a further inertial sensor 39, e.g. an accelerometer. For example, the further inertial sensor 39 in the track drive provides wheel-spin, track slippage, or shock information.

In a further embodiment, the robot is configured to provide during locomotion a raising of the upper pulleys relative to the lower pulleys to provide selection between two different running surface contact faces, wherein the two contact faces differ from each other by their respective area size. In other words, the robot is configured to provide different “feet sizes” by raising the upper pulleys to different heights above ground and being able to maintain different raised positions during locomotion. For example, the robot is configured to vary running surface contact faces (vary area sizes) either actively or passively, e.g. by comprising and using additional “displaceable pulleys” (at least one per track drive) and a spring pre-forcing to get a pre-forced track. By way of example, the robot can adapt the “feet size” depending on the task of the robot, e.g. adapt the raised position and use a small feet size when standing on position and keeping position is important but use a flatter (larger feet size) for walking up a steep and difficult terrain.

The passive variant could be as well designed with a spring/damper and then this can be as well designed semi-active (changing the spring-constant or damping properties depending on the tasks of robot).

In one embodiment, the robot 101 uses an optical sensor arrangement, e.g. a stereo camera and/or a lidar unit arranged in the head 23, to provide a view of the ground in a direction of motion of the robot. The optical sensor arrangement provides a prediction of a ground state information regarding a subsequent path to be travelled by the robot 101, e.g, wherein the ground state information provides a hardness and roughness of the ground surface and/or wherein ground state information provides geometric information such as slope information, and/or wherein the ground state information provides information regarding obstacles in the path. Further sensors, e.g. the inertial sensors in the track drive 39, might provide data contributing to the ground state information. For example, the robot 101 is configured to automatically change between the full track mode and the stand-up mode on the basis of the prediction on the ground state information.

Additionally the robot 101 might provide the locomotion by a stepped motion of the legs 3, e.g, wherein the lower pulley 33 is locked during the stepped motion of the legs. Alternatively the lower pulley 33 might be idling.

It goes without saying that the robot may comprise various kinds of damping elements which reduce excitation of resonance frequencies or at least make at least one of stepped, rolling, and track locomotion more robust. Damping elements can be added in parallel or serial to any structural and relative moving element. They could be passive, semi-active or active.

Figure 3:
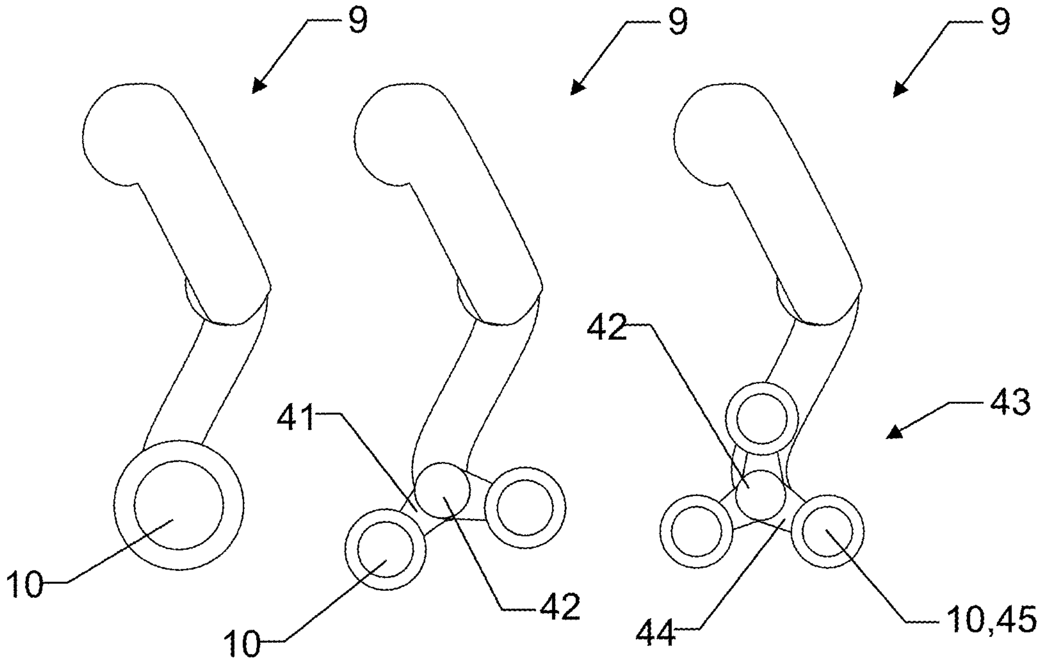
FIG. 3: several exemplary embodiments of wheel arrangements as they could be implemented in a robot.

FIG. 3 depicts several exemplary embodiments of wheel arrangements as they could be implemented in a robot, i.e. (on the left) a single wheel 10 arranged at the distal end of the lower part of the leg 9, (in the middle) a two-wheel arrangement where two wheels 10 are mounted to suspension elements 41, and (on the right) a tri-wheel arrangement 43.

By way of example, suspension elements are mounted to a main axis of the respective wheel arrangement such that they are at least rotatable relative to the main axis 42. The suspension elements 41 might be rigidly connected to each other or might be independently rotatable. For example, the suspension elements 41 or the main axis 42 comprises/comprise elastic materials.

For example, arrangements with multiple wheels provide improved traversing of uneven ground by providing two stable contact points for each of the legs 3.

The tri wheel arrangement 43 comprises three wheels 10 attached to a wheel frame 44 configured to support the three wheels 10 in a circular pattern, e.g, wherein the wheel frame 44 is rigid. The main axis 42 links the wheel frame 44 to the remainder of the leg 3 and provides a rotational degree of freedom of the wheel frame 44. Three wheel axes 45 link the wheels 10 to the wheel frame 44 such that each of the wheel axes 45 provides a wheel rotational degree of freedom independently from the rotational degree of freedom of the main axis and from the wheel rotational degrees of freedom of the other two wheel axes. By way of example, apart from improved stability, the tri-wheel arrangement provides for stair climbing via rolling locomotion which, for example, can be advantageous over a stepped motion when carrying heavy loads.

Figure 4:
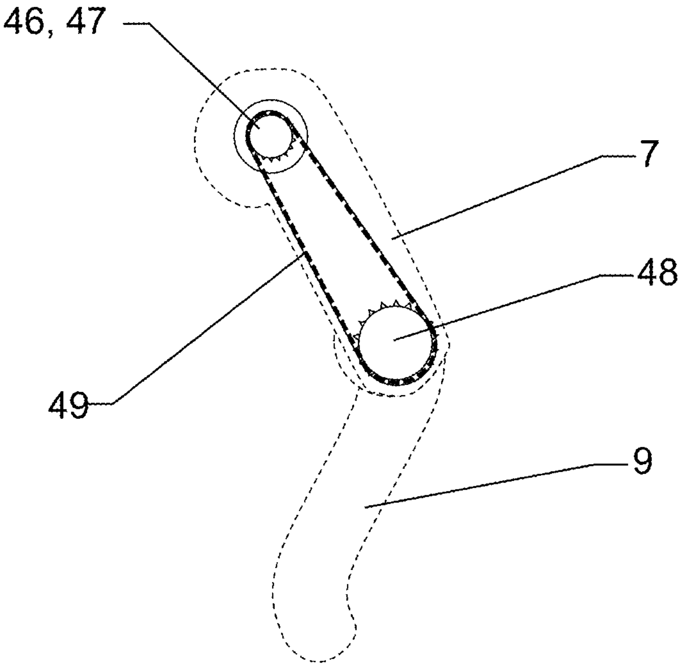
FIG. 4: an exemplary embodiment of a mechanically actuated leg as it can be used in a robot, wherein the leg comprises two drive shafts and a transmission element such that one of the drive shafts provides a mechanical actuation of the other drive shaft via the mechanical actuation element.

FIG. 4 depicts, with dashed lines, an exemplary embodiment of a mechanically actuated leg as it can be used in a robot. The leg comprises an upper part 7 and lower part 9 such that upper 7 and lower parts 9 are connected by a knee joint 8 configured to provide a swiveling movement of the lower part 9 relative to the upper part. The upper part 7 of the leg comprises a drive shaft 46 mechanically connected to an electric motor 47. The knee joint comprises a further shaft 48 mechanically connected to the knee joint, such that a rotation and/or swiveling movement of the further shaft 48 causes a swiveling movement of the knee joint. The drive shaft 46 and the further shaft 48 are connected by a mechanical transmission element 49 such that the drive shaft 46 provides a mechanical actuation of the further shaft 48 via the mechanical transmission element 49. In the depicted embodiment the drive shaft 46 and the further shaft 48 each comprise a toothed area and the mechanical transmission element 49 is a chain drive. Alternative embodiments might comprise (non-exhaustive list) a belt drive, e.g. a v-belt, or a toothed bar as mechanical transmission element 49.

By way of example, the electric motor 47 is arranged at the hip and configured as so-called dual-axis drive motor comprising two nested motors, wherein each of the two motors can be rotated with mutual independent speed and direction. This provides a compact drive module configured to independently drive the hip joint 6 and the knee joint 8. For example, the dual-axis drive motor is configured as described with reference to FIG. 14.

Figure 5:
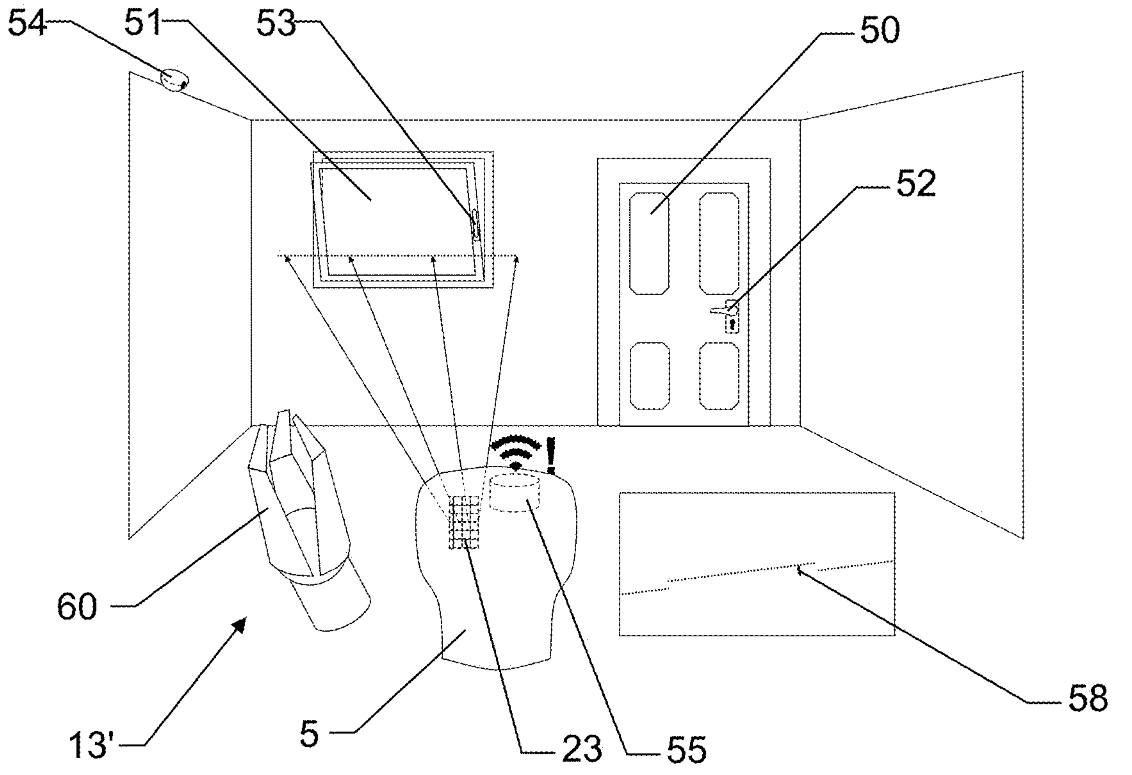
FIG. 5: relates to an exemplary application of a robot for monitoring an environment.

FIG. 5 relates to an exemplary application of a robot for monitoring an environment, e.g. a business complex. The environment comprises movable barrier objects such as a door 50 and a window 51. In the example, shown, the door 50 is closed and the window 51 is in a partly open position. Such a condition can lead to security risks, e.g. burglary, potential equipment damage due to adverse weather conditions or additional heating demand.

The depicted environment also comprises a generic security camera 54 mounted on the ceiling. While such generic security cameras 54 are suitable to provide information about the rough condition of the area they are less suitable, especially due to their fixed position, to provide fine details about the condition of the barrier objects 50, 51, e.g. to assess whether the said barrier objects are properly shut and/or secured. To overcome this deficiency, a mobile robot (for the sake of simplicity the figure only depicts the head 5 and a hand joint arrangement 13' of the robot) is used to patrol the environment to control the state of the environment, in particular the state of the movable barrier objects 50, 51.

The exemplarily depicted robot comprises a wireless communication module 55 for accessing a digital reference map of the environment comprising a set of movable barrier objects. The patrol path of the robot is derived to provide a passing of each known movable barrier objects. The robot is also foreseen to localize itself in the environment and identify previously not-known movable barrier objects.

The robot further comprises a lidar unit 23 in the head, wherein the lidar unit 23 is configured to provide a coordinative scan of the environment and the robot is configured to use lidar data of the lidar unit 23 to automatically identify movable barrier objects 50, 51 within the environment. The lidar data, in the figure schematically provided by line scan, comprise information regarding the blocking state of the movable barrier objects. For example, a lidar scan is specifically targeted to obtain information regarding the blocking state of the movable barrier objects 50, 51. Alternatively, the lidar scan for obtaining information regarding the blocking state is a byproduct of a surveying scan being performed continuously to obtain 3D information on the surroundings, e.g. to provide navigation information for the robot.

The blocking state of the movable barrier object 50,51 is determined via a geometric test parameter 58, depicted in the figure as a distance jump, and a respective test criterion. By way of example, geometric test parameters include angle information or distance information. Furthermore, the robot is configured to identify control components such as a window handle 52 and a door handle 53, wherein the geometric test parameter 58 and an associated test criterion provide for correlating a geometric pose of the control components 52, 53 with a locking state of the movable barrier objects 50, 51. By way of example, other control components identifiable by the robot are sliding or rotating latches, mechanical door locks, padlocks etc. Furthermore, some control components might comprise visible blocking elements, e.g. sliding or rotation latches, and the geometric test parameter provides a geometric pose of said blocking components. For example, the robot is configured to access a database comprising the control components 52, 53 associated with a given movable barrier object 50, 51 and a nominal location of the control components 52, 53 relative to the movable barrier object associated to an opened or locked state.

By way of example, the robot is further configured to access a 3D reference model representing the environment with the barrier objects 50, 51 in a reference state, wherein the robot is configured to determine an alert state based on a difference analysis for identifying a difference between the 3D reference model and a 3D model of the environment determined from the actually generated lidar data. For example, the difference analysis is carried out to compare an geometric pose of the movable barrier objects 50, 51 or of the control component 52, 53 with poses in the reference model. The robot then transmits the alert state via the wireless communication module 55 to a site-supervising unit.

In particular, the robot can be configured to provide time stamped lidar data and to determine a target state of the blocking state of the barrier object 50, 51 based on the time stamp. For example, the target state corresponds to a defined time schedule providing different target states as a function of time of day, e.g, wherein a different target state is determined for day and night. The robot may further be configured to provide for learning of different target states based on an assessment of 3D models of the environment, which were generated based on older lidar data.

The robot can be configured to autonomously patrol the environment according to a predefined patrol path. This could include specific deployment of the robot to check a target barrier object. For example, the robot is configured to provide a user interface, which allows the selection of one or more barrier objects 50, 51. Upon receiving an investigation request which, for example, comprise 1.) navigating to a target location provided by the investigation request; 2.) identifying the movable barrier objects in a surroundings of the target location; 3.) determining the blocking state of the movable barrier objects 50, 51 in the surroundings of the target location; 4.) and reporting the blocking state of the movable barrier objects 50, 51 via a the wireless communication module 55, the robot autonomously carries out the tasks of the request.

For interacting with the environment, e.g. to open/close doors 50 or windows 51, the robot comprises a hand joint arrangement 13' with mechanically actuated gripping elements 60. In the embodiment shown, the gripping elements 60 form a three-finger claw. Various other configurations are possible, e.g. depending on the task of the robot and the type of objects to be interacted with. By way of example, the gripping elements 60 further comprise specific interaction elements configured to provide interaction with a specific object. For example, the specific interaction elements are configured to provide interaction with a key or a keyhole, a frame or ball-lock element, a magnetic counterpart, or a tool. The robot is configured to interfere with the control component 52, 53 of the barrier object 50, 51, in particular with the gripping elements 60, to change its blocking state.

The robot is configured to autonomously interact with a barrier object 50,51, e.g. upon detection of a deviation of the blocking state of the barrier object 50, 51 from a target state. In particular, the robot can be configured to autonomously interfere with the barrier object 50, 51 on the basis of a warning, e.g, wherein the warning is based on data of the robot or an external sensor. For example, the warning is based on temperature or humidity data for the environment and the robot is configured to close an open window 51 in case the temperature is below/the humidity is above a threshold. The warning may also be based on weather forecast data comprising an alert for adverse weather conditions and the robot, e.g, wherein the robot is configured to verify the blocking state of the barrier objects 50, 51 as a result and open/close the barrier objects based on a given weather dependent rule.

FIGS. 6 and 7 depict a robot embodiments, wherein the robots are configured to perform a coordinate measurement of a measurement object 61 by tactile (FIG. 6) or optical (FIG. 7) probing measurements carried out with sensors arranged at the hand of the robot.

For example, as depicted by FIG. 6, the robot comprises a hand joint arrangement 13 forming a hand with five fingers, wherein one of the fingers is configured to act as a tactile sensor unit 22. The coordinate measurement is performed by contacting the tactile sensor unit 22 with a measurement object 61 and guiding the tip of the tactile sensor along a measurement path 64 on the object 61 by adjusting the poses of the joints while recording the coordinates of the measurement path 64.

By way of example the depicted shoulder joint 11 provides two shoulder joint rotational degrees of freedom, the depicted elbow joint 12 provides one rotational degree of freedom, while the hand joint arrangement 13 provides further two rotational degrees of freedom.

Figure 13:
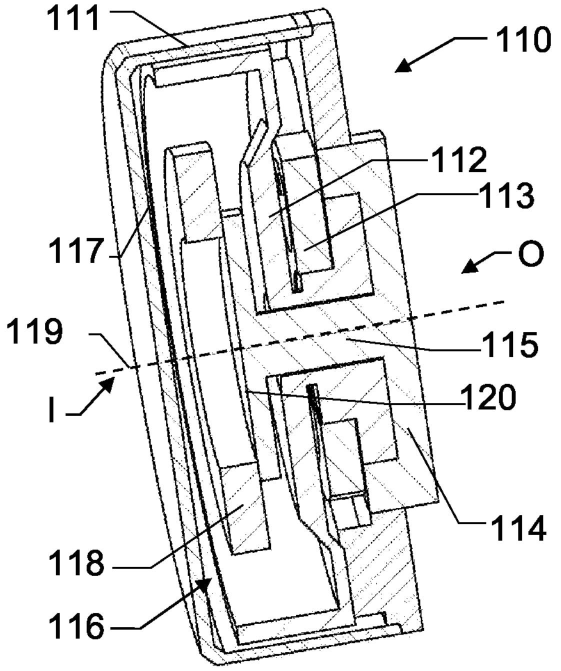
FIG. 13: an exemplary embodiment of a robotic drive module as it can be used in a robot.

The coordinates are determined by using angle encoder data provided by multiple angle encoders 68, 69, 70 configured to measure angular positions of the respective joints 11, 12, 13. While more degrees of freedom enable more complex measurement paths 64 inaccuracy of angle encoders 68, 69, 70 and/or drive components of the joints 11, 12, 13 leads to a reduced precision in setting the measurement path 64. By way of example, the angle encoders 68, 69, 70 are provided by a robotic drive module as depicted by FIG. 13, e.g. in order to provide the necessary angular position accuracy.

In the embodiment shown, the arm 4 also comprises an optical sensor 21 arranged to or integrated into the hand of the robot. The optical sensor 21 might be a metrology grade sensor for providing probe measurements by itself (e.g. see FIG. 7). However, here the optical sensor unit 21 is configured as a visual aid to ensure that the tactile sensor unit 22 is properly in contact with the measurement object 61 or that the measurement path 64 contains no obstacles. For example, such a visual aid is advantageous in case a view on the measurement path 64 is obstructed as seen from the optical sensor of the robot on the head or the chest.

FIG. 7 depicts a further embodiment of the mobile robot 201, wherein the robot 201 is configure to perform a coordinate measurement on a measurement object 61 by using an optical sensor unit 21 integrated into or arranged in the hand of the robot. The optical sensor unit 21 is configured to perform laser-based distance probing, e.g. on the basis of laser interferometry, time of flight timing (measuring start and stop time of an emitted and returning probe signal), or a laser triangulation measurement. The optical sensor unit 21 could also be configured to perform camera-based distance probing, e.g. on the basis of a photogrammetry method such as stereo imaging.

In the embodiment shown, the robot 201 comprises a tracking device 71 arranged in the head and a tracking device 72 arranged in the main body 2, e.g, wherein the tracking devices are embodied as laser trackers. The tracking devices 71, 72 provide for determining and tracking a reference position close to the optical sensor which, for example, allows to lower requirements on position giving accuracy of angle encoders associated with the joints up to the reference position. Alternatively or in addition, the tracking sensors 71, 72 are utilized to calibrate the angle encoders of the arm.

In the embodiment shown, the robot 201 also comprises a camera 27, e.g. arranged in the head, configured to provide image data for localizing a specific region of the arms, e.g. for image-based tracking of an arm movement and (indirectly via the arm movement) of the optical sensor unit 21. For example, for aiding the image-based tracking the arm comprises a tracking pattern 74 and the robot 201 is configured to automatically recognize tracking pattern sections 74 in images by the camera 27 and to associate one of the pattern sections 74 to a relative position of the one of the pattern sections with respect to the optical sensor unit 21. In particular, a plurality of tracking patterns 74 are provided to enable a tracking of the pose of a plurality of joints and/or limb components. For example, the use of tracking patterns 74 allows uninterrupted tracking in cases where the tracking sensors 27,71,72 do not have direct line of sight on the tactile sensor unit or the optical sensor unit.

Alternatively or in addition to the use of a tracking pattern or tracking target, the robot is configured to access a 3D model of the arms and to recognize arm features within images of the camera 27. The robot can then automatically associate one of the arm features to an arm feature within the 3D model of the arm and, based thereof, derive a relative position of the one of the arm features relative to the optical sensor unit 21 or the tactile sensor unit 22.

By way of example, the robot 201 itself is also configured to be tracked, e.g. for referencing measurement by the robot in an outer coordinate system, for which robot 201 comprises a tracking target 73 on each of the left and right hand joint arrangements 13. For example, the tracking target 73 is embodied as a retroreflector and foreseen to be measured and tracked by an external laser tracker, wherein the tracking target is configured such that the external laser tracker can determine the pose of the tracking target with six degrees of freedom (6DoF). The optical sensor unit 21 has a fixed, rigid relative pose to the tracking target 73.

FIG. 8 depicts a further embodiment of a robot, wherein the robot 301 is configured to perform a coordinate measurement on a measurement object 61 by a tactile sensor unit 22 arranged at a hand of the robot 301. Here, the measurement object 61 is placed on a measurement platform 75, which comprises a first docking point 76 and a second docking point 77. The robot 301 comprises a coupling interface 78 configured to provide releasable rigid docking to the docking points 76, 77 of the measurement platform 75. As a result of the rigid docking, any movement of the tactile sensor unit 22 relative to the robot 301 only depends on movements of joints between the tactile sensor unit 22 and the coupling interface 78. It is thus sufficient to provide accurate angular positioning determining only for this subset of joints between the tactile sensor unit 22 and the coupling interface 78.

By way of example, each of the joints of this subset of joints is equipped with a robotic drive module as depicted by FIG. 13.

Alternatively or in addition, the robot 301 comprises a laser tracker 72 in its main body. The laser tracker 72 is rigidly mounted on the robot with a fixed relationship to the position of the coupling interface 78. The laser tracker is configured to provide tracking of a part of the robot which is arranged between the coupling interface 78 and the tactile sensor unit 22. For example, the laser tracker is used to track the tactile sensor unit 22 and/or a part of the arm 4 which comprises the tactile sensor unit 22. The tracking by the laser tracker 72 can then be used to determine 3D position data of the tracked robot part, e.g, wherein the tracked robot part comprises a tracking target for aiding the laser-based tracking.

In the embodiment shown, the robot 301 further comprises a camera 27 in the head. While the head does not have a fixed positional relationship to the coupling interface 78 it might comprise an end stop with a fixed positional relationship to the coupling interface 78. Thus, similar to the laser tracker 72, the camera 27 an be used to provide automatic image-based tracking of a part of the robot which is arranged between the coupling interface 78 and the tactile sensor unit 22. For example, tracking by the camera 27 is aided in that the part to be tracked comprises a visual pattern for aiding the image-based tracking.

The other arm of the robot comprises a further hand joint arrangement. The further hand joint arrangement is configured to grab an object, e.g. the measurement object 61. Similar to the arm comprising the tactile sensor unit 22, any movement of the hand of the other arm only depends on movements of joints between the tactile sensor unit 22 and the coupling interface 78

By way of example, the docking points 76, 77 are associated with a docking point pattern 79, e.g. embodied as a bar code. The robot 301 is configured to use images by the camera 27 for pattern identification and pattern analysis of a docking point pattern 79 associated with one of the docking points, and to associate the docking point pattern 79 with pose information of the respective docking point. For example, the robot is configured to access a database comprising different patterns and associated pose parameters for each of the different docking point patterns 79. Alternatively or additionally, the docking points 76, 77 and the coupling interface 78 might be configured for transfer the pose information by electronic communication through the docking point 76 77.

For the depicted measurement platform 75 with two docking points 76, 77 the robot can be configured to perform a distance probing measurement such that 1.) the robot 301 docks to the first docking point 76, 2.) a first distance probing measurement relative to the first docking position 76 by the tactile sensor unit 22 is performed, 3.) the robot 301 docks to the second docking point 77, 4.) a second distance probing measurement relative to the second docking position 77 by the tactile sensor unit 22 is performed, and 5.) the first distance probing data with the second distance probing data is merged based on the pose information of the first and second docking points 76, 77.

The pose information might be obtained via electronic communication. The relative pose of the first docking point to the second docking point might be obtained via merging cardinal features 80, 81 of the measurement object 61 in the first and second distance probing data. Cardinal features 80, 81 are accessible from both the first 76 and second docking points 77 and recognizable in the distance probing data due to visual, geometric or other distinguishing characteristic.

Alternatively to a docking mechanism for rigid docking (or in addition), the coupling interface comprises a high precision coupling sensor unit, e.g. comprising capacitive sensors with measuring ranges of up to some millimeters, which are distributed in space and measure positional 6DoF changes relative to the coupling counterpart as soon as the coupling interface is arranged in a docking zone. By way of example, visual cameras could be used or other sensors to measure effects near the docking-zone.

The docking mechanism, i.e. the coupling interface, can be placed anywhere on the robot, e.g. at a hand, at the main body, or at a limb. For example, multiple coupling interfaces are provided on the robot.

Figure 9:
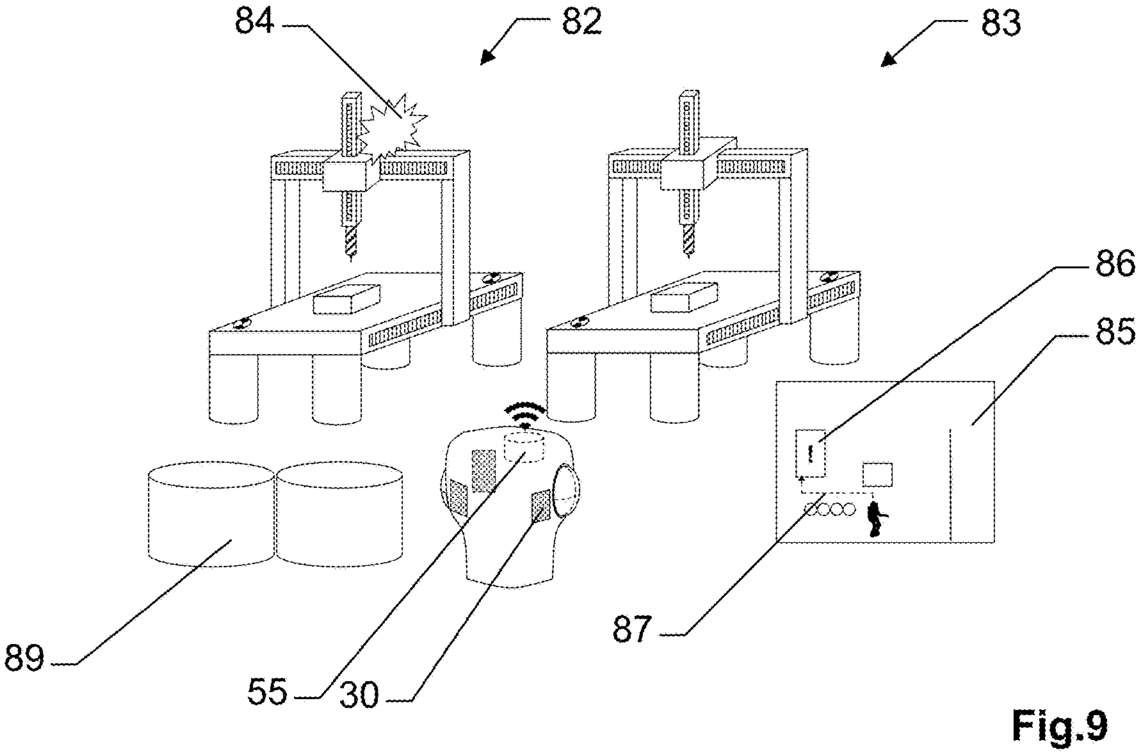
FIG. 9: an exemplary application of a robot in a factory environment with a plurality of machines, wherein the robot is configured to use sound data to single out a noise from a machine to monitor a wear state of the machine.

FIG. 9 depicts an exemplary application of a robot in a factory environment with a plurality of machines 82, 83. The robot comprises a microphone unit having a plurality of microphones 30, in particular at least three microphones, configured to acquire sounds generated within the factory environment. The first machine 82 generates a noise 84 deviating from the norm. The robot comprises an event detector/localization unit 85 to identify the noise 84 deviating from the norm and to determine the location 86 of the singled out noise 84. The event detector/localization unit 85 might utilize phase shift between the three microphones 30 to localize the source of the singled out noise. For example, the robot comprises a unidirectional microphone, e.g. a low sensitivity microphone with sensitivity below 40 dBV, and the event detector/localization unit 85 determine the location 86 of the singled out noise 84 based on an orientation and sound level of the unidirectional microphone.

The robot is configured to derive a path 87 to the location 86 of the singled out noise 84 on the basis of a digital model of the environment, derived by perception sensors of the robot. The digital model might comprise the location of further machines. In particular the robot is configured to avoid further machines and other obstacles 89. The event detector/localization unit 85 might access further data, in particular from multiple microphones installed in the factory environment in fixed positions and/or associated with a specific machine 82, 83. Alternatively the path 87 is determined and provided to the robot by the use of external devices and the robot is configured to receive the path 87 via a wireless communication module 55.

By way of example, the robot is configured to derive a patrol pattern on the basis of the digital model of the environment such that sound generated by each of the plurality of machines 82, 83 is acquired in at least one sound acquisition point of the patrol pattern. Alternatively or in addition, such patrol patterns are provided by the aid of external devices and the robot is configured to receive a patrol pattern via a wireless communication module 55.

By way of example, the system is configured to use a machine learning algorithm for training a vibration model providing indicators for different maintenance states of the machines, e.g. by training the vibration model with normal/abnormal data and then use it with the measured vibrational signal to identify if there is an abnormal state. For example, the training of the vibration is combined with operator feedback and the vibration model is retrained based on the operator feedback.

Similarly, the detection of the singled-out noise could be trained as well based on normal/abnormal state of the factory and re-trained continuously to improve the quality of the singled-out noise event detection.

Figure 10:
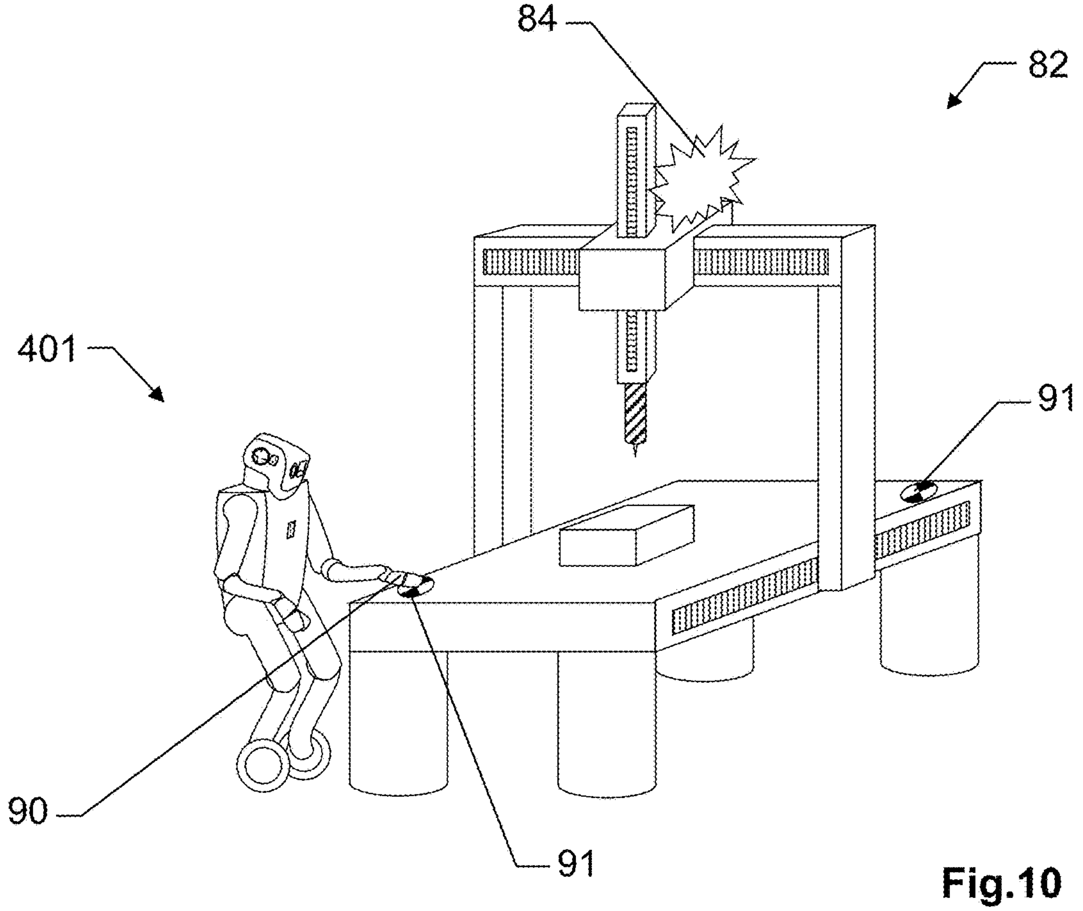
FIG. 10: the robot of FIG. 9, wherein the robot has approached a machine to carry out a vibration measurement for determining a wear state of the machine.

FIG. 10 depicts the robot 401 described with reference to FIG. 9, wherein the robot 401 has approached the first machine 82 which generates a noise 84 deviating from the norm. The robot 401 comprises a vibration sensor 90 arranged on the mechanically actuated arm 4. By autonomously bringing a probing component of the vibration sensor 90 into contact with a vibration measuring point 91 on the machine 82, the robot 401 derives vibration data of the machine 82. For example, the vibration sensor 90 comprises at least one of an inertial measurement unit, a microphone, a piezo sensor, and an optical sensor. In particular, the vibration sensor 90 is configured to provide the vibration data by direct motion coupling.

By way of example, the vibration measurement point 91 is a predefined point on the machine, e.g, wherein the robot is configured to access a look-up-table to autonomously identify the vibration measurement point 91 on the machine 82. The measurement point 91 may be specifically marked on the machine to aid finding by the robot 401 or the robot may be configured to find the measurement point 91 by analyzing the geometry of the machine. A database may also comprise reference data for a normal operation and/or for specific worn/faulty states of the respective machine 82. For example, the database comprises a vibration frequency spectra representing said different states.

Figure 11:
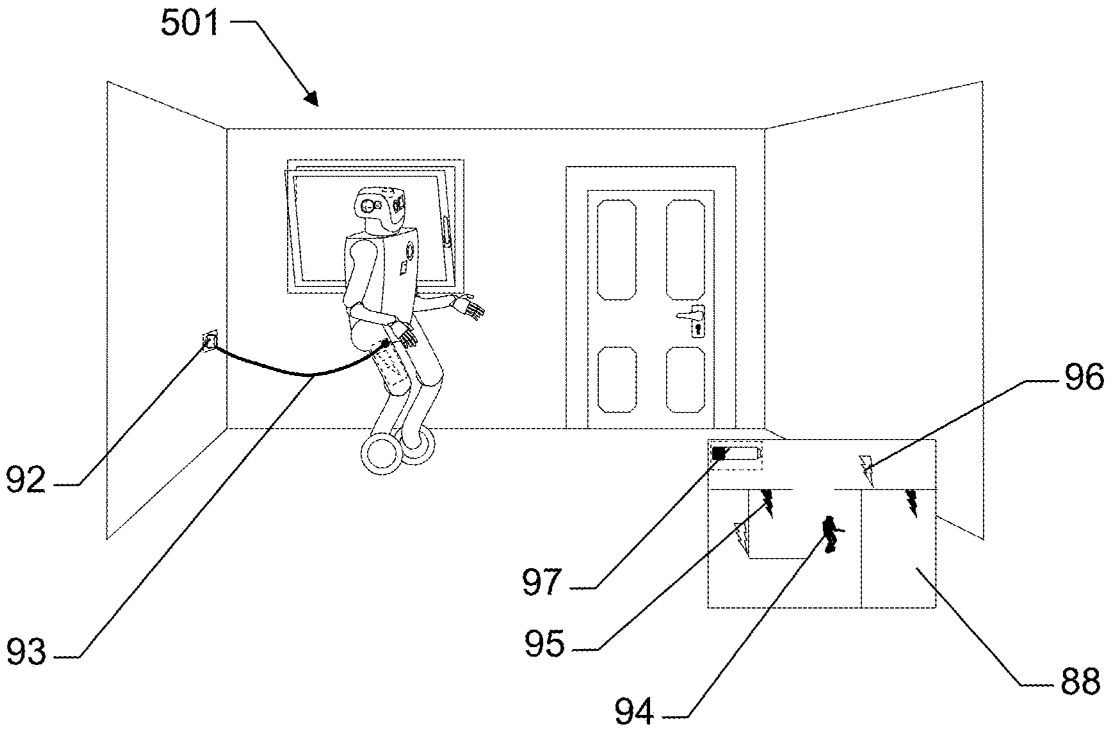
FIG. 11: a further exemplary embodiment of a humanoid robot, wherein the robot comprises a power cable compatible with a power outlet of the environment and is configured to autonomously find the power outlet and attach the power cable to the power outlet.

FIG. 11 depicts a further embodiment of a robot 501, wherein the robot 501 comprises a power cable 93 compatible with a power outlet 92 of the environment and one arm is configured to autonomously plug the power cable 93 to the power outlet 92. The robot 501 is configured to derive a model 88 of the environment on the basis of perception data, e.g. provided by a camera, a lidar unit, and/or a structured light scanner, and to localize 94 itself in the model 88, e.g. on the basis of a SLAM process. The robot 501 is further configured to recognize the power outlets 92 in the environment and to localize outlets 95, 96 in the model.

By way of example, the robot 501 comprises different power cables, each configured to be compatible with different power outlets respectively. The robot is configured to categorize the power outlets 95, 96 in the model based on their compatibility with the power cables. In particular, the robot 501 is configured to prioritize power outlets based on their charge rate characteristics, e.g. to prioritize power outlets with the largest maximal charge rate.

The robot 501 might be preferably charged on a charging station. However, the robot 501 is dispatched to one of the locations of power outlets 95, 96 by evaluating energy consumption to reach the charging station against energy consumption to reach one of the locations of power outlets 95,96, e.g. based on a threshold criterion for a remaining energy level 97 of the robot 501.

Figure 12:
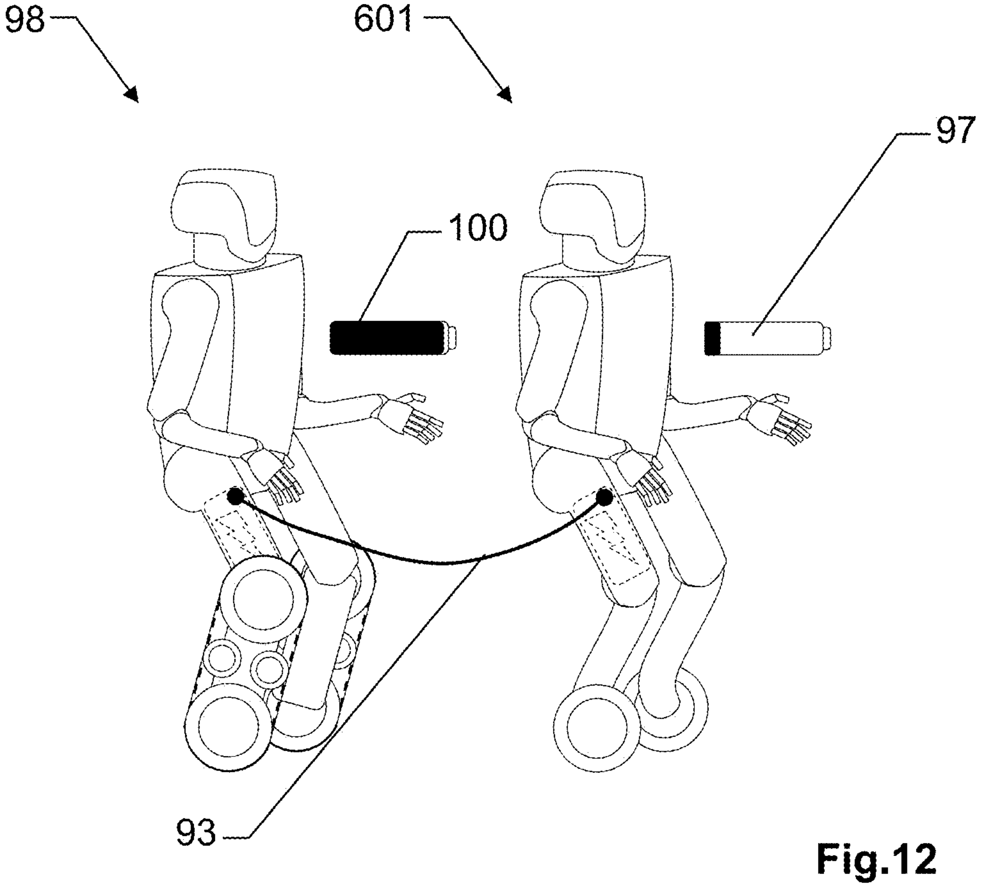
FIG. 12: a further exemplary embodiment of a humanoid robot, wherein the robot comprises a power cable and is configured to autonomously connect the power cable to another robot.

FIG. 12 depicts a further embodiment of a robot 601, wherein the robot 601 comprises a power cable 93 and a power outlet/inlet which is compatible with a power inlet/outlet of a further robot 98. The power cable 93 enables connection between the two robots 601, 98 and a transfer of electric energy between the two robots, e.g. to a battery compartment 20 of the robot 601.

By way of example, the robot 601 has a remaining energy level 97 such that the robot 601 cannot reach a charging station nor a power outlet. The dispatched further robot 98 has remaining energy level 100 allowing a transfer of electrical energy to the robot 601. The robots 601 is configured to autonomously connect to the further robot 98 by connecting the power cable 93 to the power outlet 99 of the further robot 98.

FIG. 13 shows in a 3D-cross sectional view of an exemplary robot drive unit 110 to be used in a metrological robot such as a humanoid robot of FIGS. 6-8, with high precision measuring instruments such as a metrologic laser scanning unit. The drive unit 110 comprises inside a housing 111 an electric motor with a rotor 112 and a stator (not depicted). For transmission of the rotor movement, the drive unit 110 further comprises a gearbox 113, for example a cycloidal gear as in principle known in the art. The gearbox 113 picks up the rotor rotation on its gearbox input side or primary side I (in the figure on the left) and transmits the rotation to its gearbox output side or secondary side O (in the figure on the right). A gear output axis or flange 114 is arranged at the gearbox output side O.

The drive module 110 further comprises an angle or rotary encoder 116 with a scale 118 and a sensing part 117 for measuring a rotation or rotational position of the gearbox 113 resp. for measuring a position of the output axis 119. In contrast to known embodiments, the rotary encoder 116 is arranged on the input side I of the drive unit 110 resp. gearbox 113 (i.e. arranged on the left in the figure).

Therefore, the encoder 116 is connected to the output side O by a connecting part 115. In the example, the connecting part 115 is embodied as a shaft in the center of the drive unit 110 which connects the flange 114 with the scale 118. The scale 118, arranged on the inside distal end of connection shaft 115 is for example embodied as a glass ring or circle as part of an opto-electronic angle encoder 116, with the ring or circle plane perpendicular to the axis of rotation or output axis 119. Alternative measurement principles can for example be magnetic or capacitive ones as in principle known in the art. The glass ring 118 is rigidly attached to the connection shaft 115 by a shaft extension or shaft disc 120 which extends parallel to the glass circle 118 at the input side I as depicted.

Thus, the output rotation of the gear 113 is transferred or returned to the input side I by the connection 115 and the encoder scale 118 rotates identically to the gear output rotation. The axis 119 going through the motor axle is connecting the gear output with the encoder disc 118, bringing the output rotation to the high precision encoder 116. Hence, by reading or sensing scale 118 with the encoder's sensor arrangement 117, the gear output rotation can be measured.

Alternatively to the depiction, the shaft disc 120 can be embodied itself as a code carrier or encoder rotor disk resp. can comprise scaling features which can be read or sensed by encoder sensors 117, e.g. optical scale elements. As another example, one or more magnets are attached to the inside end of shaft 115 to be sensed by a hall sensor situated at the PCB, an encoder arrangement which allows for absolute rotary angle measurement.

As indicated in the figure, the encoder's sensing part resp. the active part of the encoder 116 is arranged on the left inner side of the housing 111. For example in case of an opto-electronic measurement principle, a light emitting and receiving unit is arranged on a PCB for emitting light towards the glass ring 118 and receiving light reflected back from code elements of ring 118.

With the shown configuration, the encoder glass circle 118 can be mounted directly above the motor PCB. Thus, the arrangement allows to place the encoder sensors 117 on same PCB as the motor electronics. Therefore, a single PCB is sufficient and the drive unit 110 has a compact, space minimized design.

A motor controller of the robotic drive unit 110 can be programmed to use the position information from the rotary encoder 116 to control the motor commutation. Thereby, the design with only one, common PCB, i.e. integration of the encoder electronics on the motor circuit board, facilitates the arrangement for such a motor control using the output of the integrated rotary encoder. Additionally or alternatively, motor control by rotational position information can be implemented by an additional (low-accuracy) rotation sensor situated at the motor rotor side, i.e. before the gear 113, as in principle known in the art. For example, a single hall sensor, e.g. arranged as mentioned above, covering only one "coil interval" (360°/n coils) and/or a magnetic feedback of motor coils is used for motor control.

Figure 14:
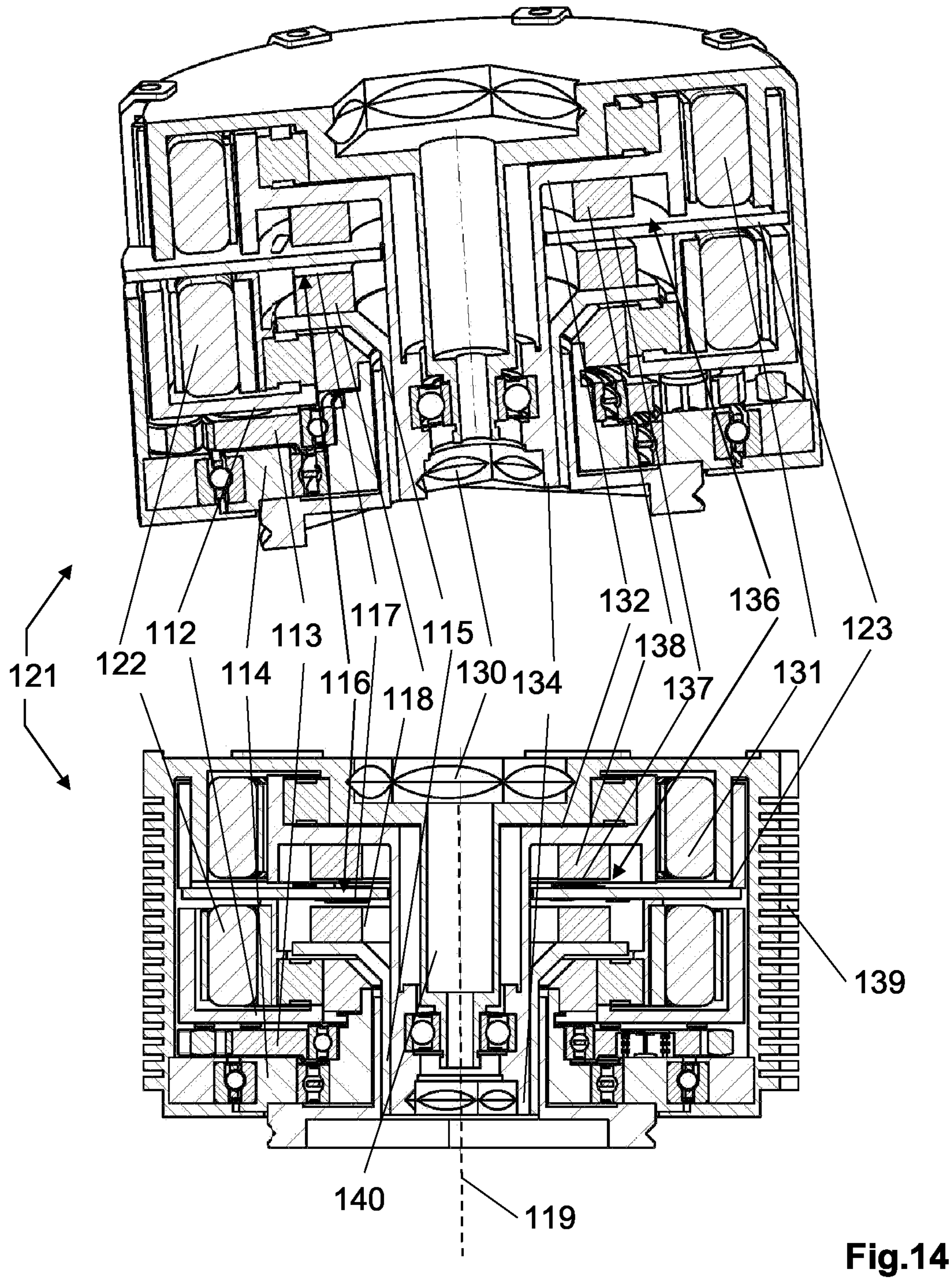
FIG. 14: depicts an exemplary embodiment of a dual-axis drive motor as it can be used in a robot.

FIG. 14 shows an embodiment of a robotic drive joint as a dual axis drive joint 121 in a 3D-cross sectional view (top panel) and 2D-cross sectional view (bottom panel), as it can be used in a robot.

Like the example depicted in FIG. 13, the drive unit 121 comprises a motor—here denoted outer motor—with an (outer) stator (coils) 122 and (outer) rotor 112, the rotation of which is in the example transmitted by a gear 113 such as a cycloidal gearbox to a gear output 114, for example for driving a first robot part. As explained in more detail above, the gear output side rotation is transferred conformingly to the inner side via a rigid connection 115 to a (first) encoder 116 or more precisely to a (first) scale 118 such as a circular glass scale. The first scale 118 can be sensed by a sensing part 117 of the first encoder 116 arranged at a PCB 123 in the inner of the drive unit 121, e.g. integrated in a motor circuit board.

Above that first or outer motor arrangement with gear 113 and encoder 116 for reading the gear's output rotation at the gear's input side, the drive unit 121 comprises a second or inner motor arrangement, therewith being a dual axis drive unit 121. The inner motor comprises an inner stator 131 and an inner rotor 132 which is led to the output side of the drive unit 121. However, in contrast to the outer drive without gear transmission, therewith providing a direct inner motor output 134, for example for driving a second robot part.

The drive unit 121 further comprises a second encoder 136 for measuring the rotation of the inner motor resp. inner rotor. This "inner" encoder 136 comprises a scale 138, too, e.g. a glass circle or other form of a code carrier as known in the art. The scale 138 is read by a sensor 137. The second sensor(s) 137 is arranged on the other side of PCB 123 as the first sensor(s) 117, hence, the drive unit 121 comprises a "central" PCB, which can also comprise the motor circuit, with encoder sensors 117,137 on both sides. Therefore, only one static PCB 123 and only one micro controller for all motors as well as encoders for two independent motors or drives is needed.

The drive unit 121 further comprises a static electrical and mechanical interface 130 with an electrical or magnetic connector, which can be embodied for example for attachment by snapping or by screwing, with hollow a central shaft 140, e.g. for cable feed through, and can comprise an integrated cooling as schematically indicated by gills 139. Thus, a dual axis drive unit 121 with a common housing and interface 130 for two drives is provided.

This dual axis drive unit 121, with or without a gearbox 113, shows a relatively simple static interface (regarding electric cabling and mechanics) and further provides the advantages that the last movable element is fully 360° operatable without any cabling limitations. Both drives can be nonstop rotated about the rotation axis 119 a complete rotation with mutual independent speed and direction. Thereby, each output is sensor controlled regarding angle, torque and/or force by a respective angle sensor 116,136, thus controlled.

The dual axis drive module 121 may be modified or show additional features such as mentioned with regard to the embodiments described with regard to FIG. 13 or appropriate additional components, e.g. an additional (low-accuracy) rotation sensor situated at a motor rotor side.

Although aspects are illustrated above, partly with reference to some preferred embodiments, it must be understood that numerous modifications and combinations of different features of the embodiments can be made. All of these modifications lie within the scope of the appended claims.

The invention claimed is:

1. A mobile robot, comprising:

a main body, a mechanically actuated articulated arm attached to the main body and configured to move relative to the main body, wherein the articulated arm is attached to the main body by a joint and comprises two limbs connected to each other by a further joint, a limb position determination arrangement comprising multiple angle encoders to measure angular positions of the joint and the further joint of the articulated arm, and a locomotion unit, configured to provide locomotion of the robot over ground, wherein:

the arm and a robot component that is different from the arm, denoted further sensor accommodation component, particularly the main body, a head attached to the main body at an upper part of the main body, or a further arm, each comprise a probing sensor being configured to provide distance probing of a surface of an object to be measured by the robot, and the robot comprises a referencing functionality, which comprises:

scanning of the arm by means of the probing sensor of the further sensor accommodation component, and/or scanning of a robot part, particularly a part of the main body, a part of the head, or a part of the further arm, by means of the probing sensor of the arm, and combining data of the limb position determination arrangement with a result of the scanning of the arm and/or the scanning of the robot part to determine referencing data providing for a position determination of the probing sensor of the arm.

2. The robot according to claim 1, wherein the probing sensor of the further sensor accommodation component is embodied as a tracker, a laser tracker or a camera based tracker, configured to track a target area or a cooperative target configured to provide a tracking signal to the laser tracker.

3. The robot according to claim 1, wherein the referencing functionality comprises that the robot autonomously moves the arm and uses the probing sensor of the arm to carry out the scanning of the robot part.

4. The robot according to claim 3, wherein the probing sensor of the arm is embodied as optical or tactile sensor and the scanning of the robot part includes approaching and measuring different positions on the robot part by the probing sensor of the arm.

5. The robot according to claim 1, wherein the robot is configured to provide multiple settable measurement arrangements, which differ from each other by providing different positioning of the joint and the further joint, wherein the referencing functionality comprises:

setting one of the settable measurement arrangements and controlling of the locomotion unit to move the robot with respect to the object to be measured so that the robot assumes a calibration position where the probing sensors have an unobstructed view onto each other, and carrying out the scanning of the arm and/or the scanning of the robot part in the calibration position.

6. The robot according to claim 1, wherein the referencing functionality comprises:

using the probing sensor of the further sensor accommodation component to scan an area of the arm spaced away from the probing sensor of the arm in order to provide 3D information of the area, automatically associating the area with a relative position parameter providing a relative position of the probing sensor of the arm with respect to the area by taking into account the 3D information, and using the relative position parameter to determine the referencing data.

7. The robot according to claim 6, wherein the arm comprises a pattern, in particular a visual pattern, and the robot is configured:

to automatically recognize a pattern section within a measurement of the pattern by the probing sensor of the further sensor accommodation component, and to automatically associate the pattern section to the position parameter, wherein the position parameter provides a relative position of the pattern section with respect to the probing sensor of the arm.

8. The robot according to claim 1, wherein:

the robot is configured to access a 3D model of the arm and to automatically recognize an arm feature within a measurement by the probing sensor of the further sensor accommodation component, the referencing functionality comprises automatically associating the arm feature to an arm feature within the 3D model of the arm and, based thereof, associating the arm feature to a further relative position parameter providing a relative position of the arm feature with respect to the probing sensor of the arm, and using the further relative position parameter to determine the referencing data.

9. The robot according to claim 1, wherein the distance probing is provided by laser based scanning and/or camera based scanning.

10. The robot according to claim 1, wherein:

the robot comprises a further mechanically actuated articulated arm attached to the main body, wherein the arm and the further arm are configured to move independently from each other relative to the main body, wherein the further arm is attached to the main body by a joint and comprises two limbs connected to each other by a further joint, the limb position determination arrangement comprises multiple angle encoders to measure angular positions of the joint and the further joint of the further arm, the further arm comprises a probing sensor being configured to provide distance probing of a surface of an object to be measured by the robot.

11. The robot according to claim 10, wherein the referencing functionality comprises:

a mutual scanning of the arms and the further sensor accommodation component by means of the probing sensors, and using results of the mutual scanning to determine the referencing data.

12. The robot according to claim 1, wherein the joint is a swivel joint or revolute joint.

13. The robot according to claim 1, further comprising providing for a compensation of a positioning error of the limb position determination arrangement.

* * * * *